US012769956B2

(12) United States Patent
Prasad

(10) Patent No.: US 12,769,956 B2
(45) Date of Patent: Oct. 20, 2026

(54) COLLABORATIVE FRAMEWORK FOR UTILIZING GENERATIVE MODEL(S)

(71) Applicant: GOOGLE LLC, Mountain View, CA (US)

(72) Inventor: Ajay Prasad, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 127 days.

(21) Appl. No.: 18/962,639

(22) Filed: Nov. 27, 2024

(65) Prior Publication Data

US 2026/0148012 A1 May 28, 2026

(51) Int. Cl.
*G06F 40/40* (2020.01)

(52) U.S. Cl.
CPC .................................... *G06F 40/40* (2020.01)

(58) Field of Classification Search
USPC ...................................................... 704/1–504
See application file for complete search history.

(56) References Cited

U.S. PATENT DOCUMENTS 11,277,360 B2 * 3/2022 Chen ........................ G06F 40/35
11,916,767 B1 * 2/2024 Wu ......................... G06N 3/096
12,142,277 B2 * 11/2024 Fink .................... G06F 16/3325
12,626,695 B1 * 5/2026 Balasubramaniam ........................ G10L 15/197
2021/0320889 A1 * 10/2021 Chen ................... G06F 16/3329
2022/0189474 A1 * 6/2022 Sharifi .................. G06F 3/0488
2023/0297728 A1 * 9/2023 Benjamin ............... G06F 30/10 703/1
2024/0296178 A1 * 9/2024 Jia ........................... G06F 40/35
2024/0356871 A1 * 10/2024 Brewer ................... H04L 51/04
2024/0362213 A1 * 10/2024 Grenader ................ G06F 16/22

(Continued)

FOREIGN PATENT DOCUMENTS

WO WO-2024220526 A1 * 10/2024 ......... H04L 12/1822
WO 2024228967 A2 11/2024

OTHER PUBLICATIONS

Wang et al., "Unleashing the Emergent Cognitive Synergy in Large Language Models: A Task-Solving Agent through Multi-Person Self-Collaboration" arXiv:2307.05300v4 [cs.AI] 23 pages, dated Mar. 26, 2024.

(Continued)

*Primary Examiner* — Marcus T Riley
(74) *Attorney, Agent, or Firm* — Gray Ice Higdon

(57) ABSTRACT

Implementations relate to: obtaining, from each agent of a plurality of agents, a respective natural language (NL) prompt, wherein each of the respective NL prompts includes one or more candidate parameters; aggregating the respective NL prompts to form a joint NL prompt; and causing the joint NL prompt to be processed using a generative model (GM) to generate responsive content. Aggregating the respective NL prompts to form the joint NL prompt can include: identifying a first candidate parameter and a conflicting second candidate parameter included in the respective NL prompts; selecting, based on a disambiguation process, the first candidate parameter for inclusion in the joint NL prompt in lieu of the conflicting second candidate parameter; and determining, based on the respective NL prompts and the selection of the first candidate parameter in lieu of the conflicting second candidate parameter, the joint NL prompt.

20 Claims, 9 Drawing Sheets

(56) References Cited

U.S. PATENT DOCUMENTS

| | | | | |
|---|---|---|---|---|
| 2025/0094725 | A1* | 3/2025 | Vishnoi | G06F 16/90332 |
| 2026/0111466 | A1* | 4/2026 | Zabuawala | G06F 16/2282 |
| 2026/0127232 | A1* | 5/2026 | Sharifi | G06F 16/387 |
| 2026/0148012 | A1* | 5/2026 | Prasad | G06F 40/40 |

OTHER PUBLICATIONS

Matt Kosinski "How to prevent prompt injection attacks" IBM. 15 pages, dated Apr. 24, 2024.
"AI Background Remover" PromptHub. 6 pages, dated May 14, 2024.
"New Launch: Automatic Prompt Generator" PromptHub. 11 pages.
Anish Agarwal "Navigating the Maze of GenAI: Understanding Conflicting Prompts and Building Enterprise Prompt Stores" 16 pages, dated Aug. 31, 2024.
Feng et al., "CoPrompt: Supporting Prompt Sharing and Referring in Collaborative Natural Language Programming" arXiv:2310.09235v3 [cs.HC] 21 pages, dated Mar. 1, 2024.
Wallace, E. et al., "The Instruction Hierarchy: Training LLMs to Prioritize Privileged Instructions", arXiv.org, arXiv:2404.13208, 13 pages, dated Apr. 19, 2024.
Wang, J. et al., "Mixture-of-Agents Enhances Large Language Model Capabilities", arXiv.org, arXiv:2046.04692, 15 pages, dated Jun. 7, 2024.
Ministry of Intellectual Property, Republic of Korea, International Search Report and Written Opinion issued in Application No. PCT/US2025/054557, 10 pages, dated Mar. 19, 2026.

* cited by examiner

COLLABORATIVE FRAMEWORK FOR UTILIZING GENERATIVE MODEL(S)

BACKGROUND

Various generative model(s) (GM(s)) have been proposed that can be used to process natural language (NL) content and/or other input(s), to generate output that reflects generative content that is responsive to the input(s). For example, large language model(s) (LLM(s)) have been developed that can be used to process NL content and/or other input(s), to generate LLM output that reflects generative NL content and/or other generative content that is responsive to the input(s). As another example, visual generation models (sometimes referred to as "vision language models") have been developed that can be used to process NL content and/or other input(s), to generate visual outputs such as image and/or video data that is responsive to the input(s).

In some instances, inputs to LLM(s) and/or GM(s) can be formulated and/or provided by "agent(s)" in order for these agent(s) to perform various tasks. These agent(s) may be hosted at or otherwise accessible to client devices, and may in turn have access to a variety of GMs. For example, an agent at a client device may be configured to receive input from a user of the client device and to process the user input using local LLM(s) and/or GM(s) at the client device. The agent may determine in this or other manners that the user has provided an NL prompt (e.g., requesting performance of natural language processing (NLP) tasks(s)) which requires or would benefit from processing using other GM(s) (e.g., cloud-based GM(s)) accessible to the agent. In various non-limiting examples, this may be because performance of the NLP task(s) requires further computational processing power, requires access to specific function(s), and/or requires access to specific information. In such instances, the agent may provide the NL prompt as input to the appropriate GM(s) for processing.

SUMMARY

Implementations described herein relate to a collaborative framework for multiple agents and/or users to utilize generative model(s) (GM(s)) for generating responsive content. More particularly, but not exclusively, techniques are described herein for allowing multiple agents and/or users collaborating on generative task(s) to aggregate multiple natural language (NL) prompts into a joint NL prompt, allowing for efficient processing of the joint NL prompt and efficient completion of the generative task(s) by the GM(s). In a range of scenarios, multiple agents (e.g., multiple agents each corresponding to a particular client device) may have separate, but contextually related, NL prompts to be provided to particular GM(s) (e.g., cloud-based GM(s)). For example, the NL prompts may be contextually related in that they relate to the same generative task, e.g., they provide parameter(s) for the same generative task. Issuing these NL prompts to the GM(s) separately may cause the GM(s) to process the prompts in a serial manner, e.g., one after another. This can cause processing of the NL prompts and completion of the generative task(s) (e.g., by generating responsive content) to be slow and computationally intensive. By aggregating the separate NL prompts together to form a joint NL prompt in a collaborative environment (e.g., a shared input interface accessible to each of the agents), computational resource expenditure can be reduced (for example, compared to processing NL prompts from multiple agents separately).

In some scenarios, NL prompt(s) can contain conflicting requests or conflicting information (e.g., in the form of parameter(s) which contradict each other, are partially or wholly incompatible, or otherwise conflict with each other). Techniques are described herein for efficiently disambiguating and/or resolving any such conflicts between parameter(s) of the NL prompts during the aggregation process. In additional or alternative scenarios, one or more of the NL prompts can contain parameter(s) which are "locked", e.g., in order to prevent these locked parameter(s) from being overridden by any other (optionally conflicting) parameter(s) and/or to prevent these locked parameter(s) from being overridden by any request(s) to modify the locked parameter(s). Techniques are described herein for ensuring that locked parameter(s) are efficiently processed during the aggregation process such that they appear in the joint NL prompt without being overridden.

In various implementations, each agent of a plurality of agents may have a respective NL prompt. For example, some or all of the respective NL prompts may be received as user inputs at client device(s) corresponding to the agents. Additionally or alternatively, some or all of the respective NL prompts may be implied NL prompts determined by the agents and/or GM(s) corresponding to said agents. In other words, implied agent queries may not be directly based on any specific user input. In some examples, the respective NL prompts may be obtained or received by a computing device which implements the collaborative framework described herein (e.g., a remote server separate from the plurality of agents and/or corresponding client devices). In some examples, the respective NL prompts may be obtained or received by a particular agent of the plurality of agents (optionally corresponding to a particular client device), which can act as a 'lead' agent to implement the collaborative framework described herein.

Each respective NL prompt may include one or more candidate parameters. For example, each NL prompt may comprise one or more words, phrases, semantic units, or other tokens, some or all of which can be candidate parameters. In some instances, each of the respective NL prompts may relate to one or more shared generative task(s) on which the agents are collaborating together, and each candidate parameter may be a candidate parameter for completing these one or more shared generative task(s). It will be appreciated that identifying one or more candidate parameters from each respective NL prompt can be performed in a variety of ways, including various natural language understanding techniques, using an LLM, etc. In some examples, candidate parameters from different respective NL prompts (or even from the same respective NL prompt) can conflict with each other (e.g., by providing contradictory or at least partially incompatible/inconsistent requests or definitions).

As a specific example, the agents may be collaborating on a project which involves generating C++ code for monitoring a domestic robot which can be used for completing various domestic tasks around a house. This collaborative project may involve multiple users/agents each providing requests (i.e., respective NL prompts) for capabilities which should be reflected in the C++ code. For example, a first user may provide a prompt that the C++ code should "Include a StateMonitor module which provides a warning to the user when the robot only has 10% battery charge remaining"; a second user may provide a prompt that the C++ code should "Make the StateMonitor module provide a warning to the user if any of the robot's vision sensor system, movement controller system, or object recognition system fails"; and a third user may provide a prompt that the C++ code should "Ensure the StateMonitor module only warns the user when the robot's battery will run out in 5 minutes". It will be appreciated that in this specific example, a candidate parameter from the first user's NL prompt (e.g., "warn user when battery charge=10% capacity remaining") can be seen to 'conflict' with a candidate parameter from the third user's NL prompt (e.g., "warn user when battery charge=5 minutes remaining"), in that they provide inconsistent parameters for generating the C++ code and completing the generative task. Similarly, it will be appreciated that neither of these candidate parameters conflict with candidate parameters from the second user's NL prompt (e.g., a first candidate parameter of "warn user when vision sensor system fails"; a second candidate parameter of "warn user when movement controller system fails"; and a third candidate parameter of "warn user when object recognition system fails"). The techniques described herein allow conflicts to be efficiently resolved during the process of aggregating respective NL prompts to form a joint NL prompt.

Another aspect of this specific example may be that some of the candidate parameters in the NL prompts are subject to locking inputs. For example, the second user could use a "*" character to denote a locking input (e.g., when their NL prompt is received as a typed user input), such that their NL prompt reads "Make the StateMonitor module provide a warning to the user if any of the robot's *vision sensor system*, *movement controller system*, or object recognition system fails". In this particular example, it will be appreciated that a locking input has been applied to the first candidate parameter and the second candidate parameter of the second user's NL prompt, but not the third candidate parameter. Providing these locking input(s) may indicate that the joint NL prompt formed by aggregating the respective NL prompts must incorporate the locked candidate parameters (e.g., overriding any other wholly or partially conflicting candidate parameters and/or modification requests if necessary). The techniques described herein ensure that locked parameter(s) are efficiently processed during the aggregation process such that they appear in the joint NL prompt without being overridden.

The respective NL prompts may be aggregated to form a joint NL prompt. Aggregating the respective NL prompts may involve compiling, summarizing, and/or otherwise combining the respective NL prompts into a joint NL prompt which represents the individual NL prompts. The aggregation may be performed using an LLM (e.g., an LLM which is accessible to a computing device or agent which implements the collaborative framework described herein). It will be appreciated that an LLM can be prompted to perform this aggregation such that the relationship between the respective NL prompts and the joint NL prompt can take a variety of forms in different scenarios. In one particular example, aggregating two identical NL prompts could involve 'deduplicating' the NL prompts to provide a single joint NL prompt. In another particular example, aggregating a plurality of disparate NL prompts could involve compiling a joint NL prompt which includes all of, or key parameters of, each of the disparate NL prompts (e.g., it may be possible to include all key parameters of the disparate NL prompts whilst summarizing/compressing some aspects of the prompts). As explained above, aggregating the respective NL prompts to form the joint NL prompt may involve resolving conflicts between candidate parameters and/or ensuring that locked parameter(s) are included in the joint NL prompt.

Aggregating the respective NL prompts to form the joint NL prompt may include identifying a first candidate parameter and a conflicting second candidate parameter. At least one of the respective NL prompts may include the first candidate parameter, and at least one of the respective NL prompts may include the conflicting second candidate parameter. For example, the LLM can process input comprising each of the respective NL prompts, and can be prompted to identify any candidate parameters which conflict (e.g., candidate parameter(s) which contradict, are partially or wholly incompatible, or otherwise conflict with each other). In some examples, the LLM (and/or other model(s)) can be used to generate an alignment score between different pairs of candidate parameters, and any candidate parameters with an alignment score which does not satisfy a particular threshold alignment (e.g., an alignment score which is less than a particular threshold alignment score) can be deemed to conflict. It will be appreciated that various machine learning models can be used to identify conflicting candidate parameters, including sentiment analysis models, for example.

The first candidate parameter can be selected for inclusion in the joint NL prompt in lieu of (i.e., instead of) the conflicting second candidate parameter based on a disambiguation process. This disambiguation process can take a variety of forms. For example, one possible disambiguation process could include prompting each agent of the plurality of agents to vote on whether to select the first candidate parameter or the conflicting second candidate parameter for inclusion in the joint NL prompt. These votes can be generated, for example, based on user input and/or generated using an LLM accessible to the agent. Following votes being received from some or all of the agents (e.g., within a voting time window of predetermined length), the votes can be tallied, and the candidate parameter with the most votes (e.g., the first candidate parameter) can be selected for inclusion in the joint NL prompt. Another possible disambiguation process could include identifying a lead agent from among the plurality of agents. This lead agent could be prompted to provide feedback (e.g., generated based on user input, generated using an LLM accessible to the lead agent, etc.) on whether to select the first candidate parameter or the second candidate parameter for inclusion in the joint NL prompt. Another possible disambiguation process could include using the LLM to directly decide whether to select the first candidate parameter or the second candidate parameter for inclusion in the joint NL prompt. For example, the LLM could select the first candidate parameter based on the fact that it is generally better aligned with other candidate parameter(s)/NL prompt(s) than the second candidate parameter, etc.

The joint NL prompt can be determined based on the respective NL prompts and based on the selection of the first candidate parameter for inclusion in the joint NL prompt in lieu of the conflicting second candidate parameter. For example, the LLM can be used to process input comprising at least some of the respective NL prompts (optionally all of the respective NL prompts) to generate corresponding output. This output may be representative of the joint NL prompt which, as described herein, may compile, summarize, and/or otherwise combine the respective NL prompts into a joint NL prompt which represents the individual NL prompts, and which includes the first candidate parameter but not the second candidate parameter. It will be appreciated that in some scenarios, following the disambiguation process, it may be possible to avoid processing any candidate parameter(s) which have not been selected for inclusion in the joint NL prompt using the LLM. As such, it may be possible to avoid processing some of the respective NL prompts using the LLM. In some examples, the LLM can be prompted to include the first candidate parameter in the joint NL prompt and not to include the second candidate parameter in the joint NL prompt.

The joint NL prompt can be provided to a GM to be processed using the GM. This GM is referred to herein as the cloud-based GM, although this is non-limiting, and in some implementations the cloud-based GM may be implemented e.g., at a client device. The joint NL prompt may be provided to the GM, for example, by a computing device or agent which implements the collaborative framework described herein. The cloud-based GM selected for processing the joint NL prompt may be selected based on the type of generative task(s) which the joint NL prompt relates to. As one example, the joint NL prompt may request performance of one or more text-based generative task(s). In this example, the cloud-based GM selected may be a large language model (LLM) (e.g., the LLM described herein), and the responsive content may include one or more portions of text data. As an additional or alternative example, the joint NL prompt may request performance of one or more visual-based generative tasks(s). In this example, the cloud-based GM selected may be a visual generation model or a vision language model, and the responsive content may include one or more images, and/or one or more portions of video data, and/or one or more three-dimensional models, and/or one or more portions of augmented reality and/or virtual reality content. As an additional or alternative example, the joint NL prompt may request performance of one or more audio-based generative task(s). In this example, the cloud-based GM selected may be an audio generation model, and the responsive content may include one or more portions of audio data. The responsive content can be rendered (e.g., visually and/or audibly) at one or more client devices corresponding to the agents, for example.

The collaborative framework for multiple agents and/or users to utilize generative model(s) (GM(s)) for generating responsive content described herein may provide a variety of technical advantages. Existing approaches for performing generative task(s) using GM(s) may involve interfaces which only allow a single agent/user to provide inputs/prompts to the GM(s). In situations where multiple agents/users want to collaborate on a generative task, this can involve them each generating responsive content separately, and attempting to merge or reconcile this responsive content in a variety of ways. This approach can be time-consuming and computationally expensive (e.g., due to the GM(s) having to unnecessarily duplicate processing of multiple overlapping/interrelated prompts), and may lead to unsatisfactory (e.g., inaccurate) results. The collaborative framework discussed herein provides a computationally efficient, adaptable environment for multiple agents/users to submit respective NL prompts, and generate responsive content which can be rendered to all of the agents/users. It will be appreciated that the techniques described herein can be applied to prompting/calling a variety of different types of cloud-based GM(s), as well as to a variety of other (non-generative) external tool(s) or system(s) such as API call-based systems, communication systems (e.g., phone systems), booking systems (e.g., reservation systems), etc.

Some GM(s) (e.g., the LLM(s), and/or cloud-based GM(s) described above) may be capable of providing an enormous variety of types of output (e.g., the responsive content described above). However, to achieve this level of robustness, these GM(s) may have hundreds of billions of parameters. As described herein, LLM(s) and/or cloud-based GM(s) may have billions of parameters, and may have more parameters than other GM(s), such as local GM(s) described herein. For example, a cloud-based GM may have more than 70 billion, more than 100 billion, more than 200 billion, more than 400 billion, or more than 1 trillion parameters. Consequently, processing NL prompts using these GM(s) may be computationally expensive and/or may introduce significant latency. By using the techniques described herein to consolidate multiple respective NL prompts (e.g., which relate to a shared generative task) into a single joint NL prompt, it may be possible to reduce the number of calls or queries to cloud-based GM(s), both reducing the computational resource usage at the cloud-based GM(s), as well as reducing network resource usage. In turn, reducing computational resource usage at the cloud-based GM(s) can potentially allow individual calls or prompts to be processed for a longer period by the cloud-based GM(s) without increasing overall computational resource expenditure. It will be appreciated that this approach can leverage inference-time effects associated with GM(s) to provide better (e.g., more accurate, more detailed, etc.) responses to calls or prompts.

The framework described herein can also provide a variety of tools which make collaboration on generative tasks between multiple agents and/or users more efficient and adaptable. For example, some or all agents and/or corresponding users can update their respective NL prompts over time. The techniques described herein can provide responsive content (responsive to each of the respective NL prompts) in 'real time', i.e., updating as the respective NL prompts update. By regularly caching the responsive content as well as the corresponding respective NL prompts and/or the corresponding joint NL prompt, it can be possible to implement a version control feature, allowing agents and/or users to access or roll back to previous versions of the responsive content (from before particular respective NL prompts were updated). It will be appreciated that these techniques can be applied to both "real time" scenarios where some or all of the agents/users are rapidly updating their respective NL prompts, as well as to "asynchronous" scenarios where agents/users are collaborating over a longer time period and, for example, agents/users are updating their respective NL prompts at different times. In some examples, updating the respective NL prompt(s) may only cause some aspects (e.g., only some candidate parameter(s)) of the joint NL prompt to update. In these examples, it can be possible to further improve computational efficiency by causing the cloud-based GM to process only those aspects of the updated joint NL prompt which are necessary for updating the responsive content (e.g., only a portion of the updated joint NL prompt that diverges from the joint NL prompt processed previously using the GM).

DETAILED DESCRIPTION

Figure 1:
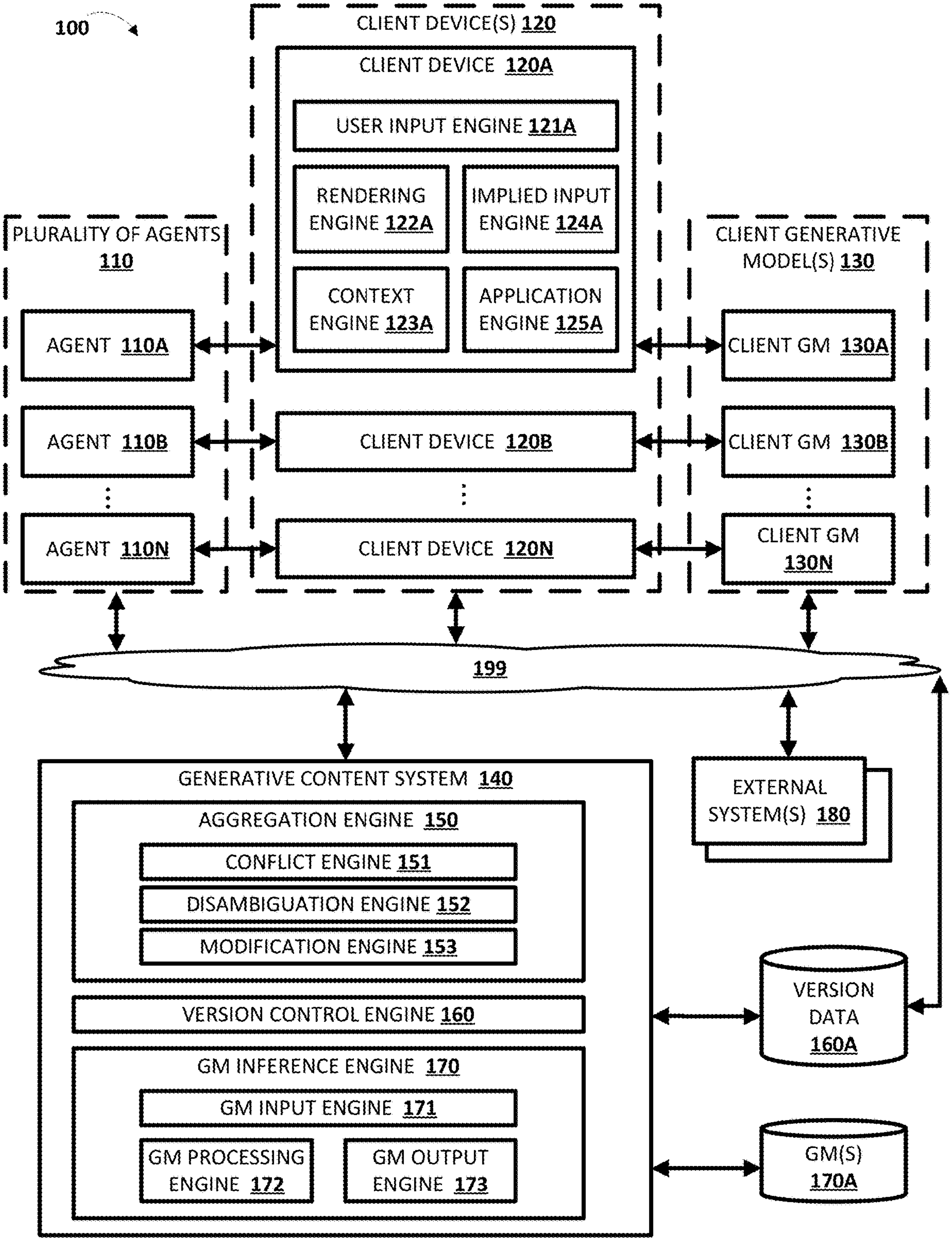
FIG. 1 depicts a block diagram of an example environment that demonstrates various aspects of the present disclosure, and in which some of the implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a plurality of agents 110, client device(s) 120, client generative model(s) (GM(s)) 130, a generative content system 140, and external system(s) 180. Although illustrated separately, in some implementations all or aspects of the plurality of agents 110, client device(s) 120, and/or client GM(s) 130 (referred to herein interchangeably as "local" GM(s), "local" LLM(s), etc.) can be implemented as part of one or more cohesive systems (e.g., where agent 110A and/or client GM 130A are hosted at client device 120A, agent 110B and/or client GM 130B are hosted at client device 120B, etc.). Although illustrated separately, in some implementations all or aspects of the generative content system 140 and the client device(s) 120 can be implemented as part of one or more cohesive systems (e.g., where generative content system 140 is hosted at one or more of client device(s) 120A, 120B, etc.). Although illustrated separately, in some implementations all or aspects of the generative content system 140 and the external system(s) 180 can be implemented as part of a cohesive system.

In some implementations, all or aspects of the generative content system 140 can be implemented locally at one or more of the client device(s) 120. In additional or alternative implementations, all or aspects of the generative content system 140 can be implemented remotely from the client device(s) 120 as depicted in FIG. 1 (e.g., at remote server(s)). In those implementations, one or more of the client device(s) 120 and the generative content system 140 can be communicatively coupled with each other via one or more networks 199, such as one or more wired or wireless local area networks ("LANs", including Wi-Fi LANs, mesh networks, Bluetooth, near-field communication, etc.) or wide area networks ("WANs", including the Internet). Similarly, one or more of the client device(s) 120 and the external system(s) 180 can be communicatively coupled with each other via the one or more networks 199.

Each client device of the client device(s) 120 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The following description of an example client device is made with respect to client device 120A (including one or more of: a user input engine 121A, a rendering engine 122A, a context engine 123A, an implied input engine 124A, and an application engine 125A). However, it will be appreciated that client devices 120B, 120C, . . . , 120N, etc., or any other client device of the client device(s) 120 may comprise corresponding features (e.g., client device 120N may include one or more of: a user input engine 121N, a rendering engine 122N, a context engine 123N, an implied input engine 124N, and an application engine 125N), and/or may provide corresponding features to those of client device 120A.

The client device 120A can execute one or more software applications, via application engine 125A, through which NL inputs, touch inputs, and/or other user inputs (e.g., including respective 'natural language (NL) prompts' referred to herein, such as NL prompt 201A) can be provided and/or selected, and/or content that is responsive to the NL inputs, touch inputs, and/or other user inputs (e.g., including 'responsive content' referred to herein such as responsive content 205) can be rendered (e.g., visually and/or audibly). The application engine 125A can execute one or more software applications that are separate from an operating system of the client device 120A (e.g., installed "on top" of the operating system)—or can alternatively be implemented directly by the operating system of the client device 120A. For example, the application engine 125A can execute a web browser, generative application (e.g., generative coding application), or automated assistant installed on top of the operating system of the client device 120A. As another example, the application engine 125A can execute a web browser software application, a generative software application (e.g., a generative coding software application), or automated assistant software application that is integrated as part of the operating system of the client device 120A. The application engine 125A (and the one or more software applications executed by the application engine 125A) can interact with or otherwise provide access to (e.g., act as a front-end for) the generative content system 140.

In various implementations, the client device 120A can include a user input engine 121A that is configured to detect user input provided by a user of the client device 120A using one or more user interface input devices (e.g., including respective NL prompts referred to herein, such as NL prompt 201A). For example, the client device 120A can be equipped with one or more microphones that capture audio data, such as audio data corresponding to spoken utterances of the user or other sounds in an environment of the client device 120A. Additionally, or alternatively, the client device 120A can be equipped with one or more vision components that are configured to capture vision data corresponding to images and/or movements (e.g., gestures) detected in a field of view of one or more of the vision components. Additionally, or alternatively, the client device 120A can be equipped with one or more touch sensitive components (e.g., a keyboard and mouse, a stylus, a touch screen, a touch panel, one or more hardware buttons, etc.) that are configured to capture signal(s) corresponding to typed and/or touch inputs directed to the client device 120A.

Some instances of input (e.g., NL prompts described herein) can be a query for a response that is formulated based on user input provided by a user of the client device 120A and detected via user input engine 121A. For example, the query can be a typed query that is typed via a physical or virtual keyboard, a suggested query that is selected via a touch screen or a mouse of the client device 120A, a spoken voice query that is detected via microphone(s) of the client device 120A (and optionally directed to an automated assistant executing at least in part at the client device 120A), or an image or video query that is based on vision data captured by vision component(s) of the client device 120A (or based on NL input generated based on processing the image using, for example, object detection model(s), captioning model(s), etc.). Other instances of NL input described herein can be a prompt for content that is formulated based on user input provided by a user of the client device 120A and detected via the user input engine 121A. For example, the prompt can be a typed prompt that is typed via a physical or virtual keyboard, a suggested prompt that is selected via a touch screen or a mouse of the client device 120A, a spoken prompt that is detected via microphone(s) of the client device 120A, or an image or video prompt that is based on an image or video captured by a vision component of the client device 120A.

In various implementations, the client device 120A can utilize one or more machine learning (ML) model(s) to process the user input. For example, the user input received at the client device 120A can be a spoken utterance. In these examples, the user input engine 121A can process, using automatic speech recognition (ASR) model(s) (e.g., a recurrent neural network (RNN) model, a transformer model, and/or any other type of ML model capable of performing ASR), audio data that capture the spoken utterance and that is generated by microphone(s) of the client device 120A to generate ASR output. The ASR output can include, for example, speech hypotheses (e.g., term hypotheses and/or transcription hypotheses) that are predicted to correspond to the spoken utterance captured in the audio data, one or more corresponding predicted values (e.g., probabilities, log likelihoods, and/or other values) for each of the speech hypotheses, a plurality of phonemes that are predicted to correspond to the spoken utterance captured in the audio data, one or more corresponding predicted values (e.g., probabilities, log likelihoods, and/or other values) for each of the plurality of phonemes, and/or other ASR output. In these implementations, the user input engine 121A can select one or more of the speech hypotheses as recognized text that corresponds to the spoken utterance (e.g., based on the corresponding predicted values for each of the speech hypotheses), such as when the user input engine 121A utilizes an end-to-end ASR model. In other implementations, the user input engine 121A can select one or more of the predicted phonemes (e.g., based on the corresponding predicted values for each of the predicted phonemes), and determine recognized text that corresponds to the spoken utterance based on the one or more predicted phonemes that are selected, such as when the user input engine 121A utilizes an ASR model that is not end-to-end. In these implementations, the user input engine 121A can optionally employ additional mechanisms (e.g., a directed acyclic graph) to determine the recognized text that corresponds to the spoken utterance based on the one or more predicted phonemes that are selected.

Notably, although the ML model(s) are described above as being implemented locally by the client device 120A, it should be understood that is for the sake of example and is not meant to be limiting. For instance, the audio data that captures the spoken utterance can additionally, or alternatively, be streamed to the generative content system 140 and/or external system(s) 180, and the generative content system 140 and/or external system(s) 180 can utilize the ASR model(s) described above (or separate cloud-based ASR model(s)) to generate the ASR output.

In various implementations, the client device 120A can include a rendering engine 122A that is configured to render content for visual and/or audible presentation to a user of the client device 120A using one or more user interface output devices (e.g., including responsive content referred to herein such as responsive content 205). For example, the client device 120A can be equipped with a display or projector that enables the content to be rendered as visual content (e.g., image(s), video(s), etc.), and optionally along with other visual content (e.g., textual content), via the client device 120A. Additionally, or alternatively, the client device 120A can be equipped with speaker(s) that enable the content to be rendered as audible content via the client device 120A.

In various implementations, the client device 120A can include a context engine 123A that is configured to determine a client device context (e.g., current or recent context) of the client device 120A and/or a user context of a user of the client device 120A (or an active user of the client device 120A when the client device 120A is associated with multiple users). In some of those implementations, the context engine 123A can determine a context based on data stored in a client device database. The data stored in the client device database can include, for example, client device data that characterizes current or recent interaction(s) of the client device 120A and/or a user of the client device 120A, location data that characterizes a current or recent location (s) of the client device 120A and/or a geographical region associated with a user of the client device 120A, user attribute data that characterizes one or more attributes of a user of the client device 120A, user preference data that characterizes one or more preferences of a user of the client device 120A, user profile data that characterizes a profile of a user of the client device 120A, and/or any other data accessible to the context engine 123A via the client device 120A or otherwise.

For example, the context engine 123A can determine a current context based on a current state of a dialog session (e.g., considering one or more recent inputs provided by a user during the dialog session), profile data, and/or a current location of the client device 120A. For instance, the context engine 123A can determine a current context of "visitor looking for upcoming events in Louisville, Kentucky" based on a recently issued query, profile data, and/or an anticipated future location of the client device 120A (e.g., based on recently booked hotel accommodations). As another example, the context engine 123A can determine a current context based on which software application is active in the foreground of the client device 120A, a current or recent state of the active software application, and/or content currently or recently rendered by the active software application. A context determined by the context engine 123A can be utilized, for example, in supplementing or rewriting NL inputs that are received at the client device 120A, in generating an implied NL input (e.g., an implied query or prompt formulated independent of any explicit NL input provided by a user of the client device 120A), and/or in determining to submit an implied NL input and/or to render result(s) (e.g., responsive content) for an implied NL input.

In various implementations, the client device 120A can include an implied input engine 124A that is configured to: generate an implied NL input (e.g., including respective NL prompts referred to herein, such as NL prompt 201A) independent of any user explicit NL input provided by a user of the client device 120A; submit an implied NL input, optionally independent of any user explicit NL input that requests submission of the NL input; and/or cause rendering of a response for the NL input, optionally independent of any explicit NL input that requests rendering of the response. For example, the implied input engine 124A can use one or more past or current contexts, from the context engine 123A, in generating an implied NL input, determining to submit the implied NL input, and/or in determining to cause rendering of a response that is responsive to the implied NL input. For instance, the implied input engine 124A can automatically generate and automatically submit an implied query or implied prompt based on the one or more past or current contexts. Further, the implied input engine 124A can automatically push the response that is generated responsive to the implied query or implied prompt to cause them to be automatically rendered or can automatically push a notification of the response, such as a selectable notification that, when selected, causes rendering of the response. Additionally, or alternatively, the implied input engine 124A can submit respective implied NL input at regular or non-regular intervals, and cause respective responses to be automatically provided (or a notification thereof to be automatically provided).

As a specific example, assume that a user of client device 120A attends a regular collaborative coding meeting which occurs weekly. In one or more previous meetings of this regular meeting series, the user provided an explicit NL input of "Generate some Javascript code which adds the functions we've created today to the user interface". This context (which can be identified e.g., by context engine 123A based on e.g., calendar item(s) accessible at client device 120A and the explicit NL input) can be used by the implied input engine 124A to automatically generate an implied NL input of "Generate some Javascript code which adds the functions we've created today to the user interface" for the current meeting (e.g., before the user provides any explicit NL input requesting the Javascript code in the current meeting). This implied NL input can be presented to the user for approval and/or can be automatically submitted for completion of the generative task in accordance with the techniques generally described herein. In this manner, computational resources associated with receiving and processing explicit NL input from the user can be saved. It will be appreciated that this is one specific example of implied input generated using implied input engine 124A, and other types of implied input are possible.

Further, the client device 120A and/or the generative content system 140 can include one or more memories for storage of data and/or software applications, one or more processors for accessing data and executing the software applications, and/or other components that facilitate communication over one or more of the networks 199. In some implementations, one or more of the software applications can be installed locally at the client device 120A, whereas in other implementations one or more of the software applications can be hosted remotely (e.g., by one or more servers) and can be accessible by the client device 120A over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) (e.g., client devices 120B, 120C, . . . 120N, which can each be associated with different users) can also implement the techniques described herein. For instance, the client device 120A, the one or more additional client devices, and/or any other computing devices of a user can form an ecosystem of devices that can employ techniques described herein. These additional client devices and/or computing devices can be in communication with the client device 120A (directly or indirectly, e.g., over the network(s) 199). As another example, a given client device can be utilized by multiple users in a shared setting (e.g., a group of users, a household, a workplace, a hotel, etc.).

Each agent of the plurality of agents 110 can be used for performing tasks, e.g., tasks requested by a user in the form of an NL prompt. For example, each agent of the plurality of agents can correspond to a particular user (of a plurality of users). Each agent of the plurality of agents 110 can perform tasks using, for example, processing resources at a client device (e.g., one or more of the plurality of client devices 120). Additionally or alternatively, each agent of the plurality of agents 110 can perform tasks by, for example, using one or more GMs (e.g., one or more of the client GM(s) 120 and/or GM(s) 170A). In one particular example, each agent of the plurality of agents 110 can have access to a respective client GM of the client GM(s) 130, where the respective agent and respective client GM are hosted at, or otherwise accessible to, a respective client device of the client device(s) 120. For this reason, the client GM(s) are interchangeably described herein as local GM(s), but this is not meant to be limiting. In these scenarios, a first user (or first group of users) can use client device 120A to operate agent 110A which can complete tasks using client GM 130A; a second user (or second group of users) can use client device 120B to operate to operate agent 110B which can complete tasks using client GM 130B, etc.

Although FIG. 1 illustrates each agent of the plurality of agents 110 as corresponding to a respective client GM of the client GM(s) 130, and as corresponding to a respective client device of the client device(s) 120 (i.e., a 1:1:1 relationship), it should be understood that this is not meant to be limiting. For example, in some instances, the plurality of agents 110 could all be hosted at or otherwise accessible to a particular client device. In these instances, each of the plurality of agents 110 could have access to a respective client GM of the client GM(s) 130, or the plurality of agents 110 may have access to a particular client GM. As another example, the client GM(s) 130 could all be hosted at or otherwise accessible to a particular client device. It will be appreciated that the techniques described herein are applicable to agent queries from a plurality of agents across a broad range of scenarios (e.g., including scenarios where the plurality of agents 110 do not utilize client GM(s) 130, scenarios where the plurality of agents 110 do not correspond to a client device(s) 120, etc.).

The generative content system 140 is illustrated in FIG. 1 as including an aggregation engine 150, a version control engine 160, and a generative model (GM) inference engine 170. Some of these engines can be combined and/or omitted in various implementations. Further, these engines can include various sub-engines. For instance, the aggregation engine 150 is illustrated in FIG. 1 as including a conflict engine 151, a disambiguation engine 152, and a modification engine 153. The GM inference engine 170 is illustrated in FIG. 1 as including a GM input engine 171, a GM processing engine 172, and a GM output engine 173. Similarly, some of these sub-engines can be combined and/or omitted in various implementations. Accordingly, it should be understood that the various engines and sub-engines of the generative content system 140 illustrated in FIG. 1 are not meant to be limiting. The generative content system 140 can be used to implement one or more of the GMs described herein; in particular the GM(s) (e.g., stored in GM(s) database 170A) used for generating responsive content. These GM(s) used for generating responsive content are interchangeably described herein as cloud-based GMs, but this is not meant to be limiting. Further generative content system(s) and/or inference engine(s) (not illustrated in FIG. 1) may be used to implement some or all of the client GM(s) 130 described herein.

Further, the generative content system 140 is illustrated in FIG. 1 as interfacing with various databases, such as version database 160A and GM(s) database 170A. The version control engine 160 may have access to at least version database 160A and GM inference engine 170 may have access to at least GM(s) database 170A. However, it should be understood that this is for the sake of example and is not meant to be limiting. For instance, in some implementations, each of the various engines and/or sub-engines of the generative content system 140 can have access to each of the various databases. Further, some of these databases can be combined and/or omitted in various implementations. Accordingly, it should be understood that the various databases interfacing with the generative content system 140 illustrated in FIG. 1 are not meant to be limiting.

Moreover, the generative content system 140 can interface with other system(s), such as external system(s) 180. The external system(s) 180 can include, for example, search system(s) (e.g., text-based search system(s), image-based search system(s), video-based search system(s), etc.) and/or other generative system(s) (other text-based generative system(s), other image-based generative system(s), other video-based generative system(s), other audio-based generative system(s), etc.) and/or other tools or functions. In some implementations, the external system(s) 180 are first-party system(s), whereas in other implementations, the external system(s) 180 are third-party system(s). As used herein, the term "first-party" or "first-party entity" refers to an entity that controls, develops, and/or maintains the generative content system 140, whereas the term "third-party" or "third-party entity" refers to an entity that is distinct from the entity that controls, develops, and/or maintains the generative content system 140. Whilst the techniques described herein are generally described with respect to calls or queries to a generative content system, it will be appreciated that these techniques are equally applicable to efficiently sharing calls or queries between agents for other tools or systems (e.g., non-generative tools or systems), which may be provided by external system(s) 180. For example, external system(s) 180 could include communication systems (e.g., phone systems) and/or booking systems (e.g., reservation systems) and the calls or queries could include various kinds of interactions with (e.g., API calls to) these systems.

As described in more detail herein (e.g., with respect to FIGS. 2, 3, 4, 5A, 5B, 5C, and 5D), the generative content system 140 can be utilized to generate responsive content which is responsive to a joint NL prompt (e.g., joint NL prompt 202). Specifically, the generative content system 140 can access a GM which can process GM input including the joint NL prompt to generate corresponding GM output. The generative content system 140 can use the GM inference engine 170 to perform this processing. Based on this GM output, responsive content which is responsive to the joint NL prompt can be determined.

The GM input engine 171 can, in response to receiving query/input data (e.g., including joint NL prompt 202), generate model input that is to be processed using GM(s) in generating a response to the query/input data. As described herein, such query/input data (e.g., including the joint NL prompt 202) can include any combination of input prompt(s), one or more images, one or more portions of video data, one or more portions of audio data, and/or one or more portions of text data. For example, joint NL prompt 202 may include a reference to one or more images, one or more portions of video data, one or more portions of audio data, and/or one or more portions of text data, and the query/input data may include both the joint NL prompt 202 and the referenced one or more images, one or more portions of video data, one or more portions of audio data, and/or one or more portions of text data. The input data can optionally include additional content, such as contextual information. The GM input engine 171 can, for example, reformat input data into a suitable form for processing using GM(s), e.g., reformat an input NL query as a prompt suitable for an LLM, reformat one or more input images into a tensor for input into an image generation model, etc.

The GM processing engine 172 can process input data that is generated by the GM input engine 171 using appropriate GM(s) to generate response/output data. Such response/output data (e.g., the "GM output" referred to herein) can include a distribution over e.g., a set of potential responsive content, etc., based on processing the query/input data using one or more GM(s).

The GM output engine 173 can determine, based on the response/output data, responsive content generated using the GM(s) for further use in the methods described herein. Such content (e.g., the "responsive content 205" referred to herein, which may be determined from the "GM output") can be determined by sampling the distributions described above.

As described in more detail herein (e.g., with respect to FIGS. 2, 3, 4, and 5A-5D), the aggregation engine 150 can be utilized to aggregate respective NL prompts (e.g., NL prompts 201A, 201B, 201C) to form a joint NL prompt (e.g., joint NL prompt 202). For example, the aggregation may be performed using an LLM. In these scenarios, the aggregation engine 150 can use (or can operate in conjunction with the GM inference engine 170 to use) an LLM (e.g., stored in GM(s) database 170A) to perform the aggregation. Aggregating the respective NL prompts to form the joint NL prompt may involve identifying conflicts between candidate parameters comprised by the respective NL prompts. Conflict engine 151 can be used to identify these conflicts using any of the techniques described herein (e.g., using an LLM, using sentiment analysis models, etc.). Aggregating the respective NL prompts to form the joint NL prompt may also involve resolving any identified conflicts between candidate parameters. Disambiguation engine 152 can be used to resolve these conflicts using any of the techniques described herein (e.g., using a disambiguation process such as an agent voting process, using an LLM, etc.). In some examples, agents and/or users may provide requests to modify or otherwise alter aspects of the joint NL prompt. Modification engine 153 can be used to determine whether requested modifications should be performed, and either modify or refrain from modifying these aspects of the joint NL prompt. For example, the modification engine 153 may decide to refrain from modifying a candidate parameter of the joint NL prompt which is subject to a locking input.

As described in more detail herein (e.g., with respect to FIGS. 2, 3, 4, and 5A-5D), the version control engine 160 can be utilized to implement a version control feature which caches (i.e., saves to memory, such as version database 160A) responsive content generated using the techniques described herein in conjunction with the joint NL prompt and/or respective NL prompts which were used to generate the responsive content. This can allow agents and/or users to access and/or roll back to previous versions of the responsive content (from before particular respective NL prompts were updated).

Figure 2:
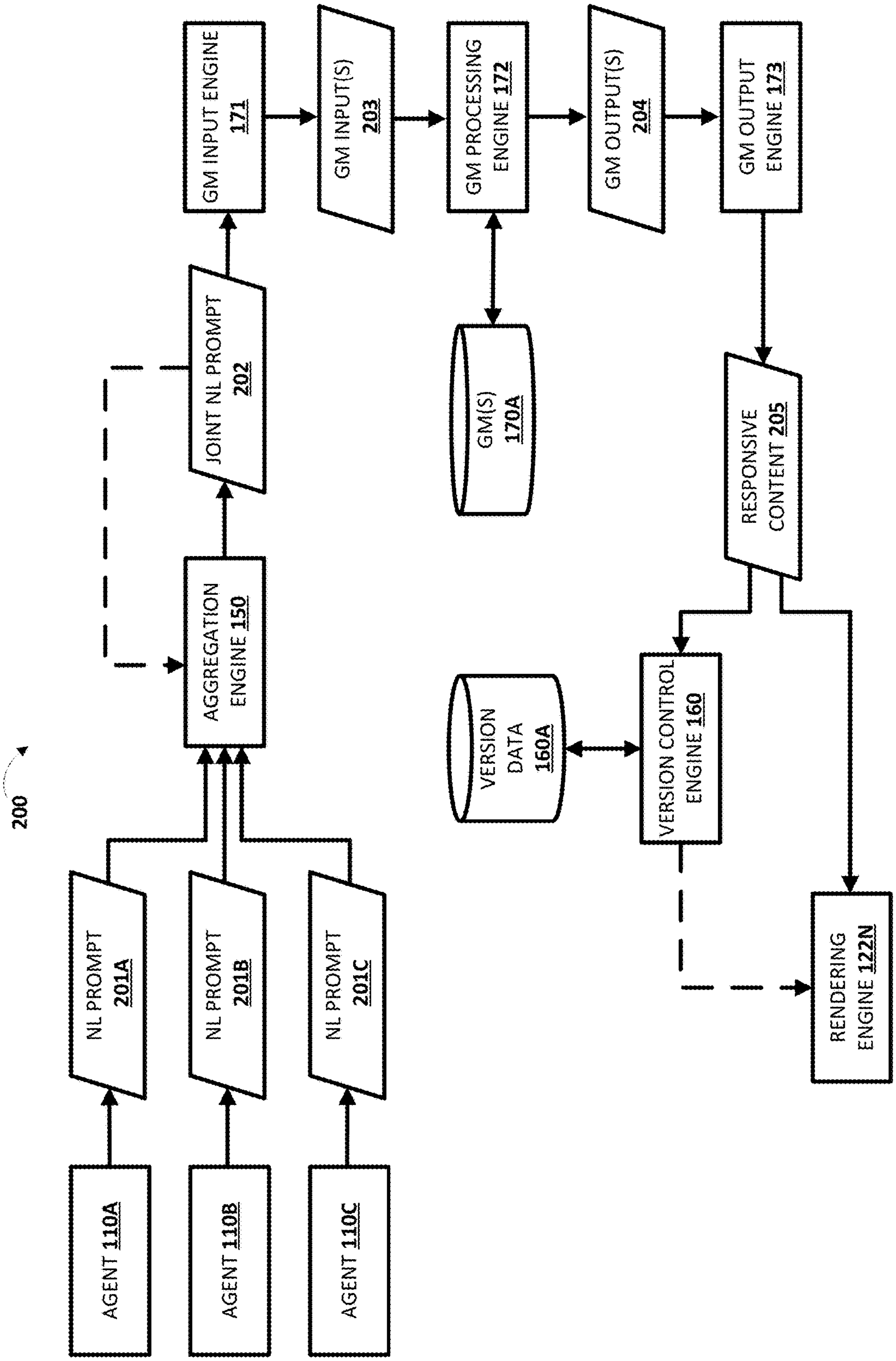
FIG. 2 depicts a process flow for utilizing various components from the example environment of FIG. 1, in accordance with various implementations.

Turning now to FIG. 2, a process flow for utilizing various components from the example environment of FIG. 1 is depicted. For the sake of example, assume that users of each of three agents 110A, 110B, and 110C each provide natural language (NL) user inputs which are detected via client device(s) and used to produce NL prompts 201A, 201B, and 201C respectively. For example, the NL user inputs can be text inputs at the client device(s), and the NL prompts can be directly obtained from these text inputs. As another example, the NL user inputs can be spoken voice inputs, and the NL prompts can be obtained via a variety of speech recognition and/or transcription techniques. It will be appreciated that the users could each be using agents operating at their own respective client device (e.g., client devices 120A, 120B, 120C, with NL user inputs being detected via user input engines 121A, 121B, 121C respectively) or, alternatively, the three agents may collaborate at a single client device (e.g., client device 120A, with NL user inputs being detected via user input engine 121A). Various possible collaborative arrangements for users to provide NL prompts to agents are possible and are specifically contemplated herein. Although the process flow 200 of FIG. 2 is described with respect to these three NL prompts 201A-C being explicit NL prompts, it should be understood that this is for the sake of example and is not meant to be limiting. For instance, the NL prompts 201A-C can include one or more implied NL prompts (e.g., as described with respect to the implied input engine(s) 124N), and the techniques described herein can be applied to more or fewer NL prompts.

In an example where the users are all using agents operating at their own client device, the user input engines 121A-C can each respectively process the natural language user inputs which they receive to generate NL prompts 201A-C. In some examples, the NL prompts 201A-C may be obtained independent of the user input engines 121A-C (e.g., they may be implied agent queries). Each of NL prompts 201A-C can be obtained by a system which can be configured to aggregate or combine the respective NL prompts 201A-C into a joint NL prompt 202. This system can be any of the collaborative environments and/or frameworks described herein, e.g., a shared input interface accessible to each of the agents. Specifically, this shared input interface could be a generic shared workspace environment (e.g., a collaborative automated assistant application) which has access to a wide variety of different cloud-based GMs (e.g., LLM(s), visual generation model(s), vision language model(s), audio generation model(s)) for performing a wide variety of different types of collaborative generative tasks. Alternatively, this shared input interface could be a specific shared workspace environment (e.g., a collaborative generative coding application) which has access to more specific cloud-based GM(s) (e.g., LLM(s) specifically adapted for generative coding) for performing specific types of collaborative generative tasks.

Aggregation of the respective NL prompts 201A-C could involve summarizing the respective NL prompts in a manner which avoids excluding aspects of the respective NL prompts and which avoids duplicating aspects of the respective NL prompts. This aggregation may be performed by aggregation engine 150. It will be appreciated that the aggregation of the respective NL prompts 201A-C to form a joint NL prompt 202 could be performed in a variety of ways, including heuristic techniques, machine-learned techniques, or using a GM (e.g., an LLM, optionally stored in GM(s) database 170A). This GM may be the same GM used to generate responsive content 205, or may be a different GM. In examples where an LLM performs the aggregation, this may be a cloud-based LLM (e.g., stored in GM(s) database 170A), or may be a local LLM (e.g., accessible at one or more of the client device(s) 120A-120C).

As described in more detail herein (e.g., with respect to FIGS. 3, 4, and 5A-5D), aggregating the respective NL prompts to form the joint NL prompt may involve identifying conflicts between candidate parameters comprised by the respective NL prompts. Conflict engine 151 can be used to identify these conflicts using any of the techniques described herein (e.g., using the LLM, using sentiment analysis models, etc.). Aggregating the respective NL prompts to form the joint NL prompt may also involve resolving any identified conflicts between candidate parameters. Disambiguation engine 152 can be used to resolve these conflicts using any of the techniques described herein (e.g., using a disambiguation process such as an agent voting process, using the LLM, etc.). In some examples, agents and/or users may provide requests to modify or otherwise alter aspects of the joint NL prompt (represented by the dashed line between the joint NL prompt 202 and aggregation engine 150 in FIG. 2). Modification engine 153 can be used to determine whether requested modifications should be performed, and either modify or refrain from modifying these aspects of the joint NL prompt. For example, the modification engine 153 may decide to refrain from modifying a candidate parameter of the joint NL prompt which is subject to a locking input.

The GM input engine 171 can, in response to receiving query/input data (e.g., including joint NL prompt 202), generate model input that is to be processed using GM(s) in generating a response to the query/input data. Returning to the specific example, the GM input(s) 203 can include at least the joint NL prompt 202 (and optionally any data, such as text, visual data or audio data referenced by the joint NL prompt).

The GM processing engine 172 can process, using one or more cloud-based GM(s) from the GM(s) database 170A, the GM input(s) 203 to generate the GM output(s) 204. In these implementations, the GM output(s) 204 can include a probability distribution over a sequence of tokens, such as words, phrases, or other semantic units that are predicted to be necessary for determining responsive content 205 which is responsive to the joint NL prompt 202. The cloud-based GM(s) can include millions or billions of weights and/or parameters that are learned through training the GM(s) on enormous amounts of diverse data. This enables the GM(s) to generate the GM output(s) 204 as the probability distribution over the sequence of tokens. The GM(s) can be initially trained and/or fine-tuned to enable the GM(s) to generate the GM output including the probability distribution over the sequence of tokens. For example, the GM may be the LLM which is used to aggregate the respective NL prompts, or another LLM. Such an LLM can be configured to process text-based inputs and can be used to generate text-based outputs. Alternatively, the GM may be a visual generation model or a visual language model which can be configured to process text-based inputs and can be used to generate visual outputs (e.g., image(s), video(s), 3D model(s), augmented and/or virtual reality data). Alternatively, the GM may be a visual generation model or a visual language model which can be configured to process text-based inputs and can be used to generate audio-based outputs.

The GM output engine 173 can determine, based on the GM output(s) 204, responsive content 205. For example, the responsive content 205 can be determined by sampling the probability distribution(s) described above.

The client device 120A or the client devices 120A-120C which the users/agents are using to collaborate may receive the responsive content 205. The appropriate rendering engine(s) 122N (e.g., 122A, or each of 122A-C) can render the responsive content 205 at the appropriate client device(s), i.e., those on which the agents are collaborating. The responsive content 205 can also be stored (e.g., cached, saved) in conjunction with the respective NL prompts 201A-C and/or the joint NL prompt 202 by the version control engine 160, e.g., in the version database 160A. Over time, users/agents can update their NL prompts 201A-C, or provide new NL prompts. As these prompts are updated and/or added, the joint NL prompt may correspondingly be updated, and the responsive content may correspondingly be updated (or new responsive content may be generated). By storing the responsive content 205 in conjunction with the respective NL prompts 201A-C and/or the joint NL prompt 202, a repository of responsive content can be created (e.g., in the version database 160A) which users/agents can use to recall previously generated responsive content, revert to previously generated responsive content, etc. In this manner, an effective version control feature can be implemented, which allows users to update or add new NL prompts without having to manually save different versions of the responsive content as they go. To render previously generated responsive content, users/agents can interact with (e.g., provide requests to) version control engine 160 (which, as represented by the dashed line between the version control engine 160 and rendering engine 122N in FIG. 2, can provide the responsive content to be rendered).

Figure 3:
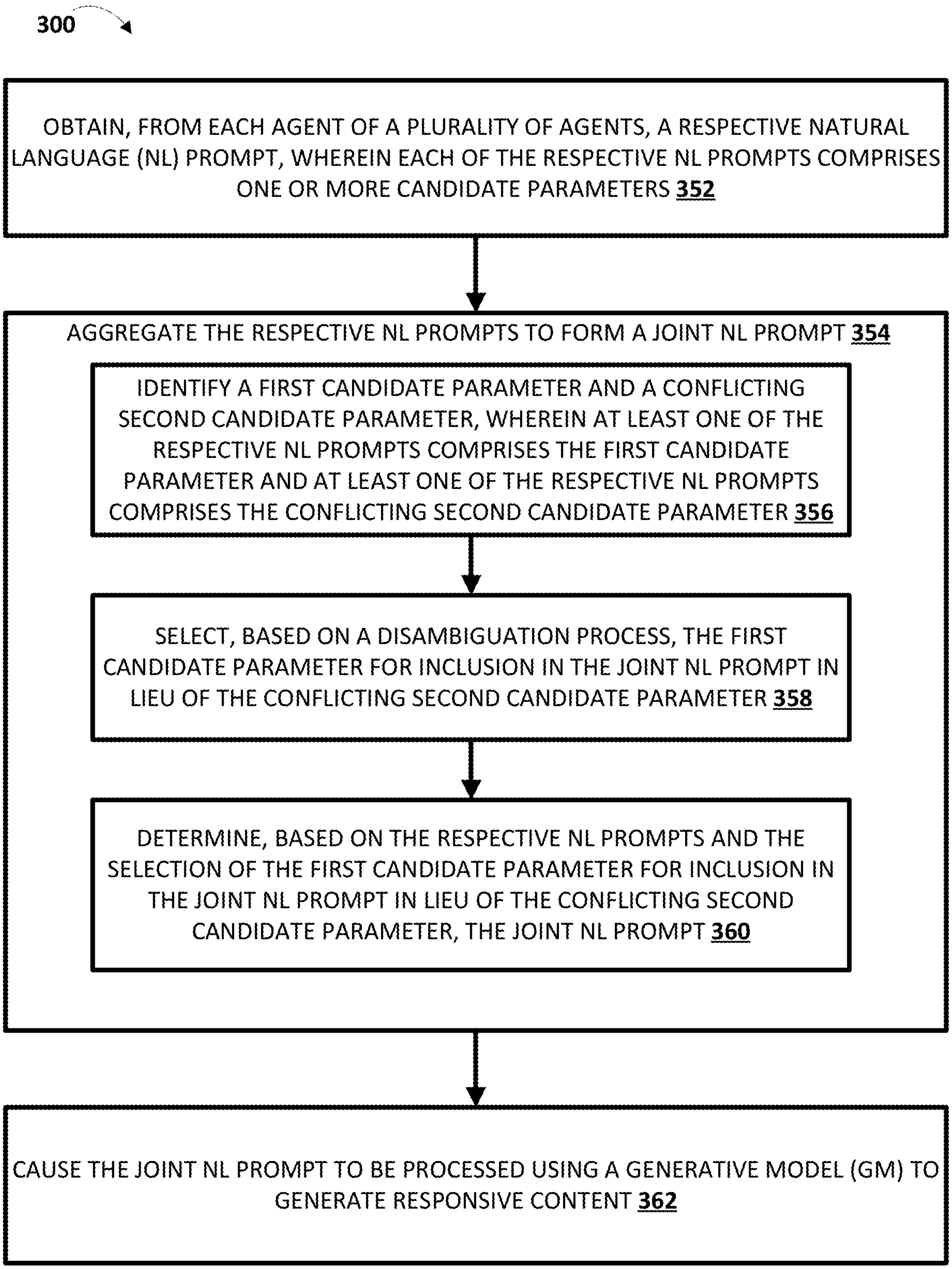
FIG. 3 depicts a flowchart that illustrates an example method for allowing multiple agents and/or users collaborating on generative task(s) to aggregate multiple natural language (NL) prompts into a joint NL prompt, where the multiple NL prompts include conflicting candidate parameters.

Turning now to FIG. 3, a flowchart is depicted that illustrates an example method 300 for allowing multiple agents and/or users collaborating on generative task(s) to aggregate multiple natural language (NL) prompts into a joint NL prompt, where the multiple NL prompts include conflicting candidate parameters. The method 300 generally corresponds to (e.g., is generally consistent with) the process flow 200 described in relation to FIG. 2. For convenience, the operations of method 300 are described with reference to a system that performs the operations. This system of method 300 includes one or more processors, memory, and/or component(s) of computing device(s). For example, the system of method 300 may provide one of the collaborative environments described herein (e.g., a shared input interface accessible to each of the agents, which can be provided in the form of an application, a webpage, etc.) and may be implemented by the generative content system 140 described in relation to FIG. 1. Moreover, while operations of the method 300 are shown in a particular order, this is not meant to be limiting. One or more operations may be reordered, omitted, and/or added. In particular, it will be appreciated that elements of the method 300 may be combined with elements of the method 400 described in relation to FIG. 4. Some possible combinations of these methods are explained in relation to FIGS. 5A-5D, although it will be appreciated that these possible combinations are not meant to be limiting.

At block 352, the system obtains, from each agent of a plurality of agents, a respective natural language (NL) prompt. Each of the respective NL prompts may include one or more candidate parameters. For example, the respective NL prompts may be received at a single client device at which the users/agents are collaborating, or may be received at separate client devices which the users/agents are using to collaborate (e.g., remotely from one another). These respective NL prompts can be provided to a shared workspace (e.g., the shared input interface in the form of an application or webpage) accessible at these client device(s), which may be hosted at one or more of the client device(s), or may be hosted remotely from the client device(s) (e.g., at a remote server). The respective NL prompts may each contain one or more candidate parameters (e.g., parameters, variables, requests in the form of e.g., words, phrases, semantic units, or other tokens) which relate to generative task(s) which the users/agents are collaborating on using the shared workspace. The system may identify the respective NL prompts as relating to common generative task(s) based on the content of the respective NL prompts (e.g., using a large language model (LLM) accessible to the system, such as a cloud-based LLM (e.g., stored in GM(s) database 170A) or a local LLM (e.g., one of client GM(s) 130) accessible to one or more of the client device(s)), and/or use of the shared workspace may generally indicate that the respective NL prompts relate to common generative task(s). It will be appreciated that the system can use a wide variety of means to determine the candidate parameters which make up each respective NL prompt (e.g., using one of the LLMs accessible to the system to separate each respective NL prompt into candidate parameter(s)).

At block 354, the system aggregates the respective NL prompts to form a joint NL prompt. For example, the system may use an LLM to aggregate the respective NL prompts to form the joint NL prompt. In other examples, the system can aggregate the respective NL prompts to form the joint NL prompt using other techniques, such as heuristic techniques. The aggregation may be performed by aggregation engine 150, optionally in conjunction with GM inference engine 170. As explained above, various LLMs may be accessible to the system, including cloud-based LLMs (e.g., stored in GM(s) database 170A) or local LLMs (e.g., one of client GM(s) 130) accessible to one or more of the client device(s), any of which could be used to aggregate the respective NL prompts to form the joint NL prompt. In some scenarios, aggregating the respective NL prompts may be straightforward, in that the candidate parameters of the various respective NL prompts are inherently compatible and can be compiled, summarized, and/or otherwise combined (e.g., using the LLM) to form a joint NL prompt. However, in some scenarios, aggregating the respective NL prompts may involve resolving conflicts or other issues with the candidate parameters of the various respective NL prompts before compiling, summarizing, and/or otherwise combining the respective NL prompts.

Block 354, shown in FIG. 3, may include each of blocks 356, 358, and 360 as sub-blocks. In other words, aggregating the respective NL prompts to form the joint NL prompt may include each of the steps set out in blocks 356, 358, and 360, as shown in FIG. 3.

At block 356, the system identifies a first candidate parameter and a conflicting second candidate parameter. At least one of the respective NL prompts includes the first candidate parameter. At least one of the respective NL prompts includes the conflicting second candidate parameter. The identification may be performed by conflict engine 151, optionally in conjunction with GM inference engine 170. For example, the LLM which aggregates the respective NL prompts can be used to identify any candidate parameters which conflict (and e.g., therefore cannot be straightforwardly combined by including both in the joint NL prompt). For instance, the LLM could be prompted to initially identify any candidate parameters which conflict before performing the rest of the aggregation. Any candidate parameters which contradict each other (e.g., provide different definitions or instructions) and/or are otherwise partially or wholly incompatible with each other may be deemed to conflict.

The system can identify at least two conflicting candidate parameters, including a first candidate parameter and a conflicting second candidate parameter. It will be appreciated that further conflict(s) may be found amongst the candidate parameters, which can similarly be resolved using the various techniques disclosed herein. Specifically, the LLM can process first LLM input which includes each of the respective NL prompts, and the LLM can be prompted, trained, and/or fine-tuned to generate corresponding first LLM output which is indicative of the first candidate parameter and the conflicting second candidate parameter. The first LLM output may also optionally be indicative of an alignment score between the first candidate parameter and the conflicting second candidate parameter, and the two candidate parameters can be deemed to conflict if this alignment score satisfies an alignment threshold (e.g., is greater than a threshold alignment score, etc.). By adjusting this alignment threshold, the threshold at which candidate parameters are deemed to conflict can be adjusted.

As another example, a machine learned sentiment analysis model can be used to identify any candidate parameters which conflict. For instance, the sentiment analysis model could be used to identify any candidate parameters which conflict before the rest of the aggregation is performed (e.g., using a separate LLM). Machine learned models of this nature may be less computationally expensive to use and store compared to cloud-based LLMs, and so may be used locally at the client device(s) (which can save both computational resources and network resources compared with using a cloud-based LLM to identify conflicting candidate parameters).

At block 358, the system selects, based on a disambiguation process, the first candidate parameter for inclusion in the joint NL prompt in lieu of the conflicting second candidate parameter. This selection, and optionally the disambiguation process, can be performed by disambiguation engine 152, optionally in conjunction with GM inference engine 170. It will be appreciated that owing to the conflict between the first and second candidate parameters, only one should be included in the joint NL prompt. A disambiguation process can describe any process used to decide which of the first and second candidate parameters to include in the joint NL prompt.

A first possible disambiguation process could involve using the LLM (e.g., the same LLM which performs the rest of the aggregation) to determine which of the first and second candidate parameters would be most appropriate to include in the joint NL prompt (e.g., based on which of the first and second candidate parameters is best aligned with the rest of the candidate parameters/respective NL prompts, which is best aligned with existing user settings/parameters, which is most accurate, etc.). Specifically, the LLM can process second LLM input which includes at least the first and second candidate parameters (and could also include e.g., other candidate parameters, existing user settings/parameters, and/or other data to compare alignment with, etc.), and the LLM can be prompted, trained, and/or fine-tuned to generate corresponding second LLM output which is indicative of feedback which selects one of the candidate parameters for inclusion in the joint NL prompt (e.g., the first candidate parameter).

A second possible disambiguation process could involve prompting users/agents to vote on whether to include the first or second candidate parameter in the joint NL prompt. For example, each agent of the plurality of agents could be prompted to provide a respective vote, and at least some of the agents (e.g., a threshold response percentage may be required) could responsively provide a vote to the system. These votes may be generated based on specific user input (i.e., where the user corresponding to the particular agent provides a user input at the corresponding client device to vote for the first or second candidate parameter), or the votes could be generated automatically. For example, the votes could be generated by a local/client model (e.g., a local/client GM or local/client LLM) corresponding to the particular agent (e.g., based on which of the first or second candidate parameter is best aligned with existing user settings/parameters, which is most accurate, etc.). The system can tally the votes and choose the first or second candidate parameter for inclusion in the joint NL prompt based on which candidate parameter received the most votes (optionally within a given time frame, to ensure a swift voting process). A third possible disambiguation process could involve prompting a specific user/agent (e.g., a user/agent whose client device is being used to host the shared workspace), referred to as a "lead" agent, to provide feedback (i.e., a vote) on whether to choose the first or second candidate parameter for inclusion in the joint NL prompt. Again, this vote could be based on explicit user input or could be generated automatically.

At block 360, the system determines, based on the respective NL prompts and the selection of the first candidate parameter for inclusion in the joint NL prompt in lieu of the conflicting second candidate parameter, the joint NL prompt. This determination may be performed by aggregation engine 150, optionally in conjunction with GM inference engine 170. As explained above, the LLM may be used to aggregate the respective NL prompts to form the joint NL prompt. Specifically, the LLM can process LLM input and the LLM can be prompted, trained, and/or fine-tuned to generate corresponding LLM output which is indicative of the joint NL prompt. In some instances, the LLM input may include each of the respective NL prompts, and optionally an indication, or specific prompt, that the first candidate parameter is to be included in the joint NL prompt (and e.g., that the second candidate parameter should not appear in the joint NL prompt). In some instances, it may be possible to reduce the amount of data which needs to be provided as LLM input by e.g., removing any candidate parameters (i.e., the second candidate parameter) which should not be included in the joint NL prompt. In any case, aggregating the respective NL prompts to form the joint NL prompt may include compiling, summarizing, and/or otherwise combining the respective NL prompts in manner which specifically ensures that the first candidate parameter appears in the joint NL prompt, but the second candidate parameter does not.

When aggregating the respective NL prompts, additional factors may also be taken into account in some scenarios. For example, some candidate parameters can be subject to "locking" inputs, which specify that these candidate parameters should appear in the joint NL prompt, overriding any conflicting candidate parameters, or requests to modify the locked candidate parameter if necessary. In some examples, only particular agents/users (e.g., the lead agent described above) may have the ability to provide these locking inputs. Specifically, aggregating the respective NL prompts to form the joint NL prompt can include identifying a locking input (e.g., based on a specific user/agent input) referring to a third candidate parameter (where the third candidate parameter is also included in at least one of the respective NL prompts) and selecting this third candidate parameter for inclusion in the joint NL prompt. The locking input referring to the third candidate parameter can indicate that the third candidate parameter should also be selected for inclusion in the joint NL prompt (e.g., along with the first candidate parameter), and correspondingly, aggregating the respective NL prompts to form the joint NL prompt may include compiling, summarizing, and/or otherwise combining the respective NL prompts in manner which specifically ensures that the first and third candidate parameters appear in the joint NL prompt, but the second candidate parameter does not.

At block 362, the system causes the joint NL prompt to be processed using a generative model (GM) to generate responsive content. The system and/or the shared workspace (e.g., the shared input interface in the form of an application or webpage) in which the users/agents are collaborating may have access to this GM (e.g., which may be stored in GM(s) database 170A). The GM may be referred to herein as the cloud-based GM, although this is not limiting, and in some instances, the cloud-based GM can be hosted at one or more of the client devices. The GM can be, or include, the LLM which aggregates the respective NL prompts or another LLM. For example, where the respective NL prompts and/or the joint NL prompt relate to a collaborative generative task which involves generating text-based data (e.g., generating prose, code, etc.), it may be appropriate to use an LLM as the GM, such that the responsive content can include one or more portions of text data. The GM can be, or include, a visual generation model or vision language model. For example, where the respective NL prompts and/or the joint NL prompt relate to a collaborative generative task which involves generating visual data (e.g., generating images, videos, 3D models, etc.), it may be appropriate to use a visual generation model or vision language model, such that the responsive content can include one or more images, one or more portions of video data, one or more 3D models, or one or more portions of augmented reality and/or virtual reality content. The GM can be, or include, an audio generation model. For example, where the respective NL prompts and/or the joint NL prompt relate to a collaborative generative task which involves generating audio data (e.g., generating music, synthesized speech, etc.), it may be appropriate to use an audio generation model, such that the responsive content can include one or more portions of audio data.

Specifically, the GM can process first GM input which includes at least the joint NL prompt (along with e.g., any data or other content referenced by the joint NL prompt) and the GM can be prompted, trained, and/or fine-tuned to generate corresponding GM output which is indicative of the responsive content. The system can cache (e.g., save or otherwise store) this responsive content in a memory (e.g., a memory accessible to generative content system 140 such as version database 160A, or a memory accessible to the client device(s) at which the users/agents are collaborating, such as a local memory). The responsive content can be cached in association with a record of the respective NL prompts and/or joint NL prompt which were used as a basis for generating the responsive content using the GM. This may allow a record of various iterations of responsive content to be maintained as the respective NL prompts and/or joint NL prompt are updated or changed over time.

The responsive content can also be rendered (e.g., visually or audibly) to users at the client device(s) at which the users/agents are collaborating. The responsive content may be rendered in conjunction with the joint NL prompt and/or the respective NL prompts, so that users/agents can clearly identify the correspondence between these inputs and outputs. The joint NL prompt can even be rendered in a manner that identifies the component respective NL prompts within the joint NL prompt (e.g., color coding the respective NL prompt of each user/agent in a different color within the joint NL prompt). Causing the responsive content to be rendered (e.g., at the shared input interface in the form of an application or webpage) can involve the system generating and serving appropriate data to the client device(s) on which the users/agents are collaborating. For example, the system may use HTTP to generate and serve a dynamic webpage to a web browser on the client device(s) visually displaying the responsive content along with the joint NL prompt and/or the respective NL prompts.

After the responsive content has been generated (or even as the responsive content is being generated), some or all of the users/agents can update their respective NL prompts. Additionally or alternatively, requests to modify the joint NL prompt (which can be rendered at the client device(s)) can also be received. These updated NL prompts (or modification requests) can include updated candidate parameter(s), and so an updated joint NL prompt can be determined based on these updated NL prompts and/or modification requests and/or updated candidate parameter(s) as appropriate (in a similar manner to how the joint NL prompt is initially determined via aggregation, e.g., using an LLM). The GM can process second GM input which includes at least part of the updated joint NL prompt and the GM can be prompted, trained, and/or fine-tuned to generate corresponding GM output which is indicative of updated responsive content. In particular, it may be possible to avoid reprocessing the whole updated joint NL prompt using the GM where, for example, the updated joint NL prompt shares at least some parameters in common with the original joint NL prompt. As such, it may be possible to process second GM input including just the portion of the updated joint NL prompt which diverges from the (original) joint NL prompt. This can reduce the computational expenditure (e.g., processing power, processing time, etc.) required at the system which implements the GM.

Users updating or modifying their respective NL prompts can occur rapidly (referred to herein as "real time" updating scenarios, e.g., where multiple users are rapidly refining or iterating their prompts at a same or similar time), or can occur over a longer time period (referred to herein as "asynchronous" scenarios e.g., where multiple users are refining or iterating their prompts separately at different times). It will be appreciated that in some scenarios, elements of both real time and asynchronous updating of respective NL prompts can occur in conjunction with each other. In order to actively manage computational expenditure at cloud-based GMs, and particularly in asynchronous scenarios where the joint NL prompts is updating relatively slowly, updated responsive content may be generated automatically in response to updating the respective NL prompts and/or joint NL prompt. Additionally or alternatively, particularly in real time scenarios where the joint NL prompt is changing relatively rapidly, and particularly when a context window associated with the joint NL prompt is large (e.g., above a threshold data size), generating updated responsive content may require active approval from users/agents.

The system can cache (e.g., save or otherwise store) this updated responsive content in a memory (e.g., a memory accessible to generative content system 140 such as version database 160A, or a memory accessible to the client device(s) at which the users/agents are collaborating, such as a local memory). The updated responsive content can be cached in association with a record of the respective updated NL prompts and/or updated joint NL prompt which were used as a basis for generating the updated responsive content using the GM. This may allow a record of various iterations of responsive content to be maintained as the respective NL prompts and/or joint NL prompt are updated or changed over time. The updated responsive content can also be rendered (e.g., visually or audibly) to users at the client device(s) at which the users/agents are collaborating. The system may receive a request from a user/agent to revert, or transition back to a previous iteration of the responsive content (or a previous iteration of a user's respective NL prompt or a previous iteration of the joint NL prompt). The relevant previous iteration of the responsive content can be retrieved from the memory in which it was cached (e.g., a memory accessible to generative content system 140 such as version database 160A, or a memory accessible to the client device(s) at which the users/agents are collaborating, such as a local memory), and rendered (e.g., visually or audibly) to users at the client device(s) in lieu of (i.e., replacing) the later iteration of the responsive content. In this manner, a version control feature can be implemented which allows users to quickly and efficiently revert back to previous iterations of the responsive content without, for example, requiring the GM to reprocess an earlier version of the joint NL prompt.

Figure 4:
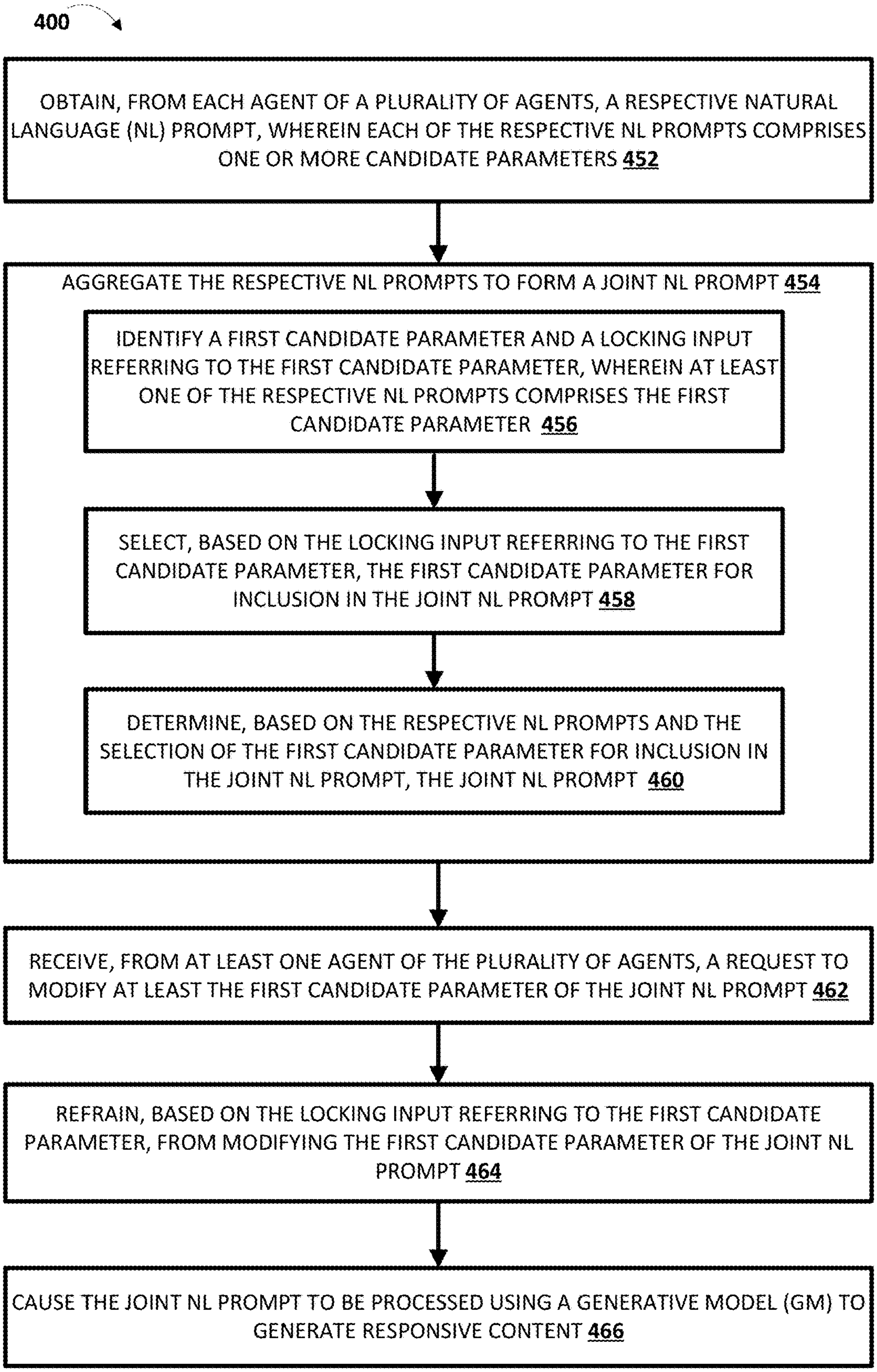
FIG. 4 depicts a flowchart that illustrates an example method for allowing multiple agents and/or users collaborating on generative task(s) to aggregate multiple NL prompts into a joint NL prompt, where the multiple NL prompts include locked candidate parameter(s).

Turning now to FIG. 4, a flowchart is depicted that illustrates an example method 400 for allowing multiple agents and/or users collaborating on generative task(s) to aggregate multiple NL prompts into a joint NL prompt, where the multiple NL prompts include locked candidate parameter(s). The method 400 generally corresponds to (e.g., is generally consistent with) the process flow 200 described in relation to FIG. 2. For convenience, the operations of method 400 are described with reference to a system that performs the operations. This system of method 400 includes one or more processors, memory, and/or component(s) of computing device(s). For example, the system of method 400 may provide one of the collaborative environments described herein (e.g., a shared input interface accessible to each of the agents, which can be provided in the form of an application, a webpage, etc.) and may be implemented by the generative content system 140 described in relation to FIG. 1. Moreover, while operations of the method 400 are shown in a particular order, this is not meant to be limiting. One or more operations may be reordered, omitted, and/or added. In particular, it will be appreciated that elements of the method 400 may be combined with elements of the method 300 described in relation to FIG. 3. Some possible combinations of these methods are explained in relation to FIGS. 5A-5D, although it will be appreciated that these possible combinations are not meant to be limiting.

At block 452, the system obtains, from each agent of a plurality of agents, a respective natural language (NL) prompt. Each of the respective NL prompts may include one or more candidate parameters. Block 452 may be analogous to block 352 of the method 300, and the respective NL prompts obtained at block 452 of method 400 may be analogous to those described with respect to block 352 of method 300. For example, the respective NL prompts may be received at a single client device at which the users/agents are collaborating, or may be received at separate client devices which the users/agents are using to collaborate (e.g., remotely from one another). These respective NL prompts can be provided to a shared workspace (e.g., the shared input interface in the form of an application or webpage) accessible at these client device(s), which may be hosted at one or more of the client device(s), or may be hosted remotely from the client device(s) (e.g., at a remote server). The respective NL prompts may each contain one or more candidate parameters (e.g., parameters, variables, requests in the form of e.g., words, phrases, semantic units, or other tokens) which relate to generative task(s) which the users/agents are collaborating on using the shared workspace. The system may identify the respective NL prompts as relating to common generative task(s) based on the content of the respective NL prompts (e.g., using a large language model (LLM) accessible to the system, such as a cloud-based LLM (e.g., stored in GM(s) database 170A) or a local LLM (e.g., one of client GM(s) 130) accessible to one or more of the client device(s)), and/or use of the shared workspace may generally indicate that the respective NL prompts relate to common generative task(s). It will be appreciated that the system can use a wide variety of means to determine the candidate parameters which make up each respective NL prompt (e.g., using one of the LLMs accessible to the system to separate each respective NL prompt into candidate parameter(s)).

At block 454, the system aggregating the respective NL prompts to form a joint NL prompt. Block 454 may be analogous to block 354 of the method 300. For example, the system may use an LLM to aggregate the respective NL prompts to form the joint NL prompt. In other examples, the system can aggregate the respective NL prompts to form the joint NL prompt using other techniques, such as heuristic techniques. The aggregation may be performed by aggregation engine 150, optionally in conjunction with GM inference engine 170. As explained above, various LLMs may be accessible to the system, including cloud-based LLMs (e.g., stored in GM(s) database 170A) or local LLMs (e.g., one of client GM(s) 130) accessible to one or more of the client device(s), any of which could be used to aggregate the respective NL prompts to form the joint NL prompt. In some scenarios, aggregating the respective NL prompts may be straightforward, in that the candidate parameters of the various respective NL prompts are inherently compatible and can be compiled, summarized, and/or otherwise combined (e.g., using the LLM) to form a joint NL prompt. However, in some scenarios, aggregating the respective NL prompts may involve resolving conflicts or other issues with the candidate parameters of the various respective NL prompts before compiling, summarizing, and/or otherwise combining the respective NL prompts.

Block 454, shown in FIG. 4, may include each of blocks 456, 458, and 460 as sub-blocks. In other words, aggregating the respective NL prompts to form the joint NL prompt may include each of the steps set out in blocks 456, 458, and 460, as shown in FIG. 4.

At block 456, the system identifies a first candidate parameter and a locking input referring to the first candidate parameter. At least one of the respective NL prompts includes the first candidate parameter. At block 458, the system selects, based on the locking input referring to the first candidate parameter, the first candidate parameter for inclusion in the joint NL prompt. At block 460, the system determines, based on the respective NL prompts and the selection of the first candidate parameter for inclusion in the joint NL prompt, the joint NL prompt.

The identification, selection, and determination may be performed by aggregation engine 150, optionally in conjunction with GM inference engine 170. For example, the aggregation engine 150 can identify that a particular candidate parameter (i.e., the first candidate parameter) has had a "locking" input applied to it by a user/agent, which specifies that this candidate parameter should appear in the joint NL prompt, overriding any conflicting candidate parameters, or requests to modify the locked candidate parameter if necessary. In some examples, only particular agents/users (e.g., a lead agent) may have the ability to provide these locking inputs. As explained above, the LLM may be used to aggregate the respective NL prompts to form the joint NL prompt. Specifically, the LLM can process LLM input and the LLM can be prompted, trained, and/or fine-tuned to generate corresponding LLM output which is indicative of the joint NL prompt. In some instances, the LLM input may include each of the respective NL prompts, and optionally an indication, or specific prompt, that the first candidate parameter is to be included in the joint NL prompt (and, optionally, that any candidate parameter(s) which conflict with the first candidate parameter should not appear in the joint NL prompt). In some instances, it may be possible to reduce the amount of data which needs to be provided as LLM input by e.g., removing any candidate parameters which should not be included in the joint NL prompt (i.e., any candidate parameters which conflict with the first candidate parameter). In any case, aggregating the respective NL prompts to form the joint NL prompt may include compiling, summarizing, and/or otherwise combining the respective NL prompts in manner which specifically ensures that the first candidate parameter appears in the joint NL prompt.

At block 462, the system receives, from at least one agent of the plurality of agents, a request to modify at least the first candidate parameter of the joint NL prompt. At block 464, the system refrains, based on the locking input referring to the first candidate parameter, from modifying the first candidate parameter of the joint NL prompt. Modification requests may be received and processed by modification engine 153, optionally in conjunction with GM inference engine 170. For example, the modification engine 153 can identify that the modification request pertains to the locked first candidate parameter, and as such, the request to modify the first candidate parameter of the joint NL prompt should be rejected. In some examples, a notification explaining this decision can be provided to the agent/user which requested the modification. Additionally or alternatively, a notification could be provided to the agent/user who issued the locking input in relation to the first candidate parameter, requiring their explicit approval to modify the first candidate parameter whilst the locking input is in effect.

At block 466, the system causes the joint NL prompt to be processed using a generative model (GM) to generate responsive content. Block 466 may be analogous to block 362 of the method 300. The system and/or the shared workspace (e.g., the shared input interface in the form of an application or webpage) in which the users/agents are collaborating may have access to this GM (e.g., which may be stored in GM(s) database 170A). The GM may be referred to herein as the cloud-based GM, although this is not limiting, and in some instances, the cloud-based GM can be hosted at one or more of the client devices. The GM can be, or include, the LLM which aggregates the respective NL prompts or another LLM. For example, where the respective NL prompts and/or the joint NL prompt relate to a collaborative generative task which involves generating text-based data (e.g., generating prose, code, etc.), it may be appropriate to use an LLM as the GM, such that the responsive content can include one or more portions of text data. The GM can be, or include, a visual generation model or vision language model. For example, where the respective NL prompts and/or the joint NL prompt relate to a collaborative generative task which involves generating visual data (e.g., generating images, videos, 3D models, etc.), it may be appropriate to use a visual generation model or vision language model, such that the responsive content can include one or more images, one or more portions of video data, one or more 3D models, or one or more portions of augmented reality and/or virtual reality content. The GM can be, or include, an audio generation model. For example, where the respective NL prompts and/or the joint NL prompt relate to a collaborative generative task which involves generating audio data (e.g., generating music, synthesized speech, etc.), it may be appropriate to use an audio generation model, such that the responsive content can include one or more portions of audio data.

Specifically, the GM can process first GM input which includes at least the joint NL prompt (along with e.g., any data or other content referenced by the joint NL prompt) and the GM can be prompted, trained, and/or fine-tuned to generate corresponding GM output which is indicative of the responsive content. The system can cache (e.g., save or otherwise store) this responsive content in a memory (e.g., a memory accessible to generative content system 140 such as version database 160A, or a memory accessible to the client device(s) at which the users/agents are collaborating, such as a local memory). The responsive content can be cached in association with a record of the respective NL prompts and/or joint NL prompt which were used as a basis for generating the responsive content using the GM. This may allow a record of various iterations of responsive content to be maintained as the respective NL prompts and/or joint NL prompt are updated or changed over time.

The responsive content can also be rendered (e.g., visually or audibly) to users at the client device(s) at which the users/agents are collaborating. The responsive content may be rendered in conjunction with the joint NL prompt and/or the respective NL prompts, so that users/agents can clearly identify the correspondence between these inputs and outputs. The joint NL prompt can even be rendered in a manner that identifies the component respective NL prompts within the joint NL prompt (e.g., color coding the respective NL prompt of each user/agent in a different color within the joint NL prompt). Causing the responsive content to be rendered (e.g., at the shared input interface in the form of an application or webpage) can involve the system generating and serving appropriate data to the client device(s) on which the users/agents are collaborating. For example, the system may use HTTP to generate and serve a dynamic webpage to a web browser on the client device(s) visually displaying the responsive content along with the joint NL prompt and/or the respective NL prompts.

After the responsive content has been generated (or even as the responsive content is being generated), some or all of the users/agents can update their respective NL prompts. Additionally or alternatively, requests to modify the joint NL prompt (which can be rendered at the client device(s)) can also be received. These updated NL prompts (or modification requests) can include updated candidate parameter(s), and so an updated joint NL prompt can be determined based on these updated NL prompts and/or modification requests and/or updated candidate parameter(s) as appropriate (in a similar manner to how the joint NL prompt is initially determined via aggregation, e.g., using an LLM). The GM can process second GM input which includes at least part of the updated joint NL prompt and the GM can be prompted, trained, and/or fine-tuned to generate corresponding GM output which is indicative of updated responsive content. In particular, it may be possible to avoid reprocessing the whole updated joint NL prompt using the GM where, for example, the updated joint NL prompt shares at least some parameters in common with the original joint NL prompt. As such, it may be possible to process second GM input including just the portion of the updated joint NL prompt which diverges from the (original) joint NL prompt. This can reduce the computational expenditure (e.g., processing power, processing time, etc.) required at the system which implements the GM.

Users updating or modifying their respective NL prompts can occur rapidly (referred to herein as "real time" updating scenarios, e.g., where multiple users are rapidly refining or iterating their prompts at a same or similar time), or can occur over a longer time period (referred to herein as "asynchronous" scenarios e.g., where multiple users are refining or iterating their prompts separately at different times). It will be appreciated that in some scenarios, elements of both real time and asynchronous updating of respective NL prompts can occur in conjunction with each other. In order to actively manage computational expenditure at cloud-based GMs, and particularly in asynchronous scenarios where the joint NL prompts is updating relatively slowly, updated responsive content may be generated automatically in response to updating the respective NL prompts and/or joint NL prompt. Additionally or alternatively, particularly in real time scenarios where the joint NL prompt is changing relatively rapidly, and particularly when a context window associated with the joint NL prompt is large (e.g., above a threshold data size), generating updated responsive content may require active approval from users/agents.

The system can cache (e.g., save or otherwise store) this updated responsive content in a memory (e.g., a memory accessible to generative content system 140 such as version database 160A, or a memory accessible to the client device(s) at which the users/agents are collaborating, such as a local memory). The updated responsive content can be cached in association with a record of the respective updated NL prompts and/or updated joint NL prompt which were used as a basis for generating the updated responsive content using the GM. This may allow a record of various iterations of responsive content to be maintained as the respective NL prompts and/or joint NL prompt are updated or changed over time. The updated responsive content can also be rendered (e.g., visually or audibly) to users at the client device(s) at which the users/agents are collaborating. The system may receive a request from a user/agent to revert, or transition back to a previous iteration of the responsive content (or a previous iteration of a user's respective NL prompt or a previous iteration of the joint NL prompt). The relevant previous iteration of the responsive content can be retrieved from the memory in which it was cached (e.g., a memory accessible to generative content system 140 such as version database 160A, or a memory accessible to the client device(s) at which the users/agents are collaborating, such as a local memory), and rendered (e.g., visually or audibly) to users at the client device(s) in lieu of (i.e., replacing) the later iteration of the responsive content. In this manner, a version control feature can be implemented which allows users to quickly and efficiently revert back to previous iterations of the responsive content without, for example, requiring the GM to reprocess an earlier version of the joint NL prompt.

Turning now to FIGS. 5A, 5B, 5C, and 5D, various non-limiting examples of allowing multiple agents and/or users collaborating on generative task(s) to aggregate multiple NL prompts into a joint NL prompt are depicted. A client device 120A (e.g., the client device 120A described with reference to FIGS. 1 and 2) may include various user interface components including, for example, microphone(s) to generate audio data based on spoken utterances and/or other audible input, speaker(s) to audibly render synthesized speech and/or other audible output, and/or a display 191 to visually render visual output. Further, the display 191 of the client device 120A can include various system interface elements 192, 193, and 194 (e.g., hardware and/or software interface elements) that may be interacted with by a user of the client device 120A to cause the client device 120A to perform one or more actions. The display 191 of the client device 120A enables the user to interact with content rendered on the display 191 by touch input (e.g., by directing user input to the display 191 or portions thereof (e.g., to a text entry box 195, to a keyboard (not depicted), or to other portions of the display 191)) and/or by spoken input (e.g., by selecting microphone interface element 196—or just by speaking without necessarily selecting the microphone interface element 196 (i.e., an automated assistant may monitor for one or more terms or phrases, gesture(s) gaze(s), mouth movement(s), lip movement(s), and/or other conditions to activate spoken input) at the client device 120A). Although the client device 120A depicted in FIGS. 5A, 5B, 5C, and 5D is a mobile phone, it should be understood that is for the sake of example and is not meant to be limiting. For example, the client device 120A may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 120A.

Figure 5A:
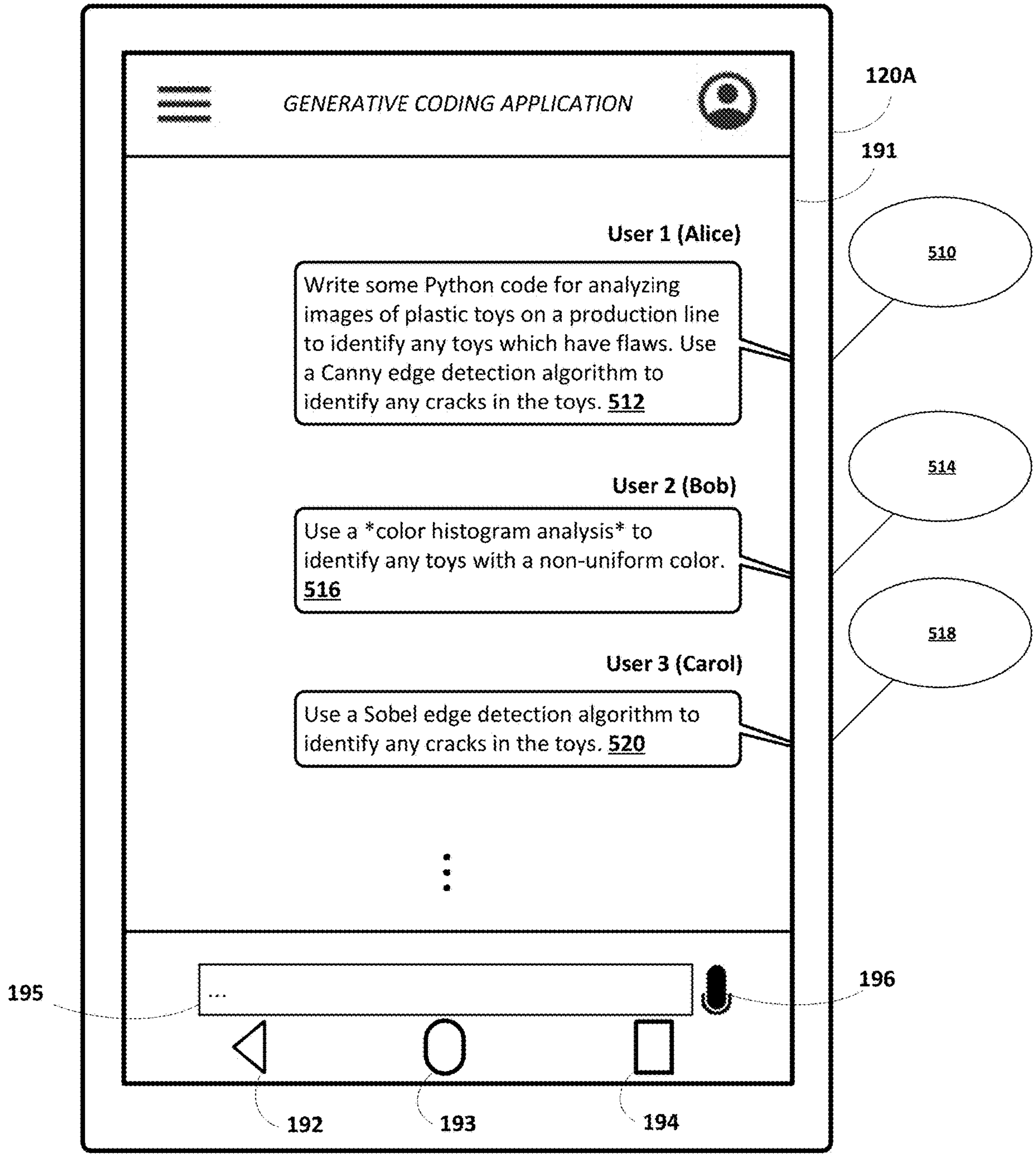
FIGS. 5A, 5B, 5C, and 5D depict various non-limiting examples of allowing multiple agents and/or users collaborating on generative task(s) to aggregate multiple NL prompts into a joint NL prompt, in accordance with various implementations.

Referring specifically to FIG. 5A, assume that a group of users (each corresponding to a respective agent) access a generative coding application, via the client device 120A, that enables the users to interact with a generative content system (e.g., the generative content system 140 of FIG. 1). Further assume that a first user (labelled as "Alice) provides a spoken voice natural language (NL) input 510 of "Write some Python code for analyzing images of plastic toys on a production line to identify any toys which have flaws. Use a Canny edge detection algorithm to identify any cracks in the toys." which corresponds to respective NL prompt 512; a second user (labelled as "Bob") provides a spoken voice NL input 514 of "Use a *color histogram analysis* to identify any toys with a non-uniform color." which corresponds to respective NL prompt 516; and a third user (labelled as "Carol") provides a spoken voice NL input 518 of "Use a Sobel edge detection algorithm to identify any cracks in the toys." which corresponds to respective NL prompt 520. The spoken voice inputs can be recognized as being provided by separate users via any suitable means. For example, the voice inputs may be provided by users remotely using their own separate client devices (e.g., client devices 120A, 120B, 120C, which can all remotely be accessing the shared input interface of the generative coding application), or the voice inputs may be provided at a single client device (e.g., client device 120A) using a voice recognition model or separate voice input modes for the different users. In this example, the second user applies a locking input to the "color histogram analysis" candidate parameter, denoted by the "*" symbol. This locking input can be applied via any suitable means, including a typed input or a spoken input (not shown in FIG. 5A), etc.

Performing the generative task (i.e., writing Python code for analyzing images of plastic toys on a production line including various specific abilities to identify toys with cracks and a non-uniform color) may require use of a cloud-based GM. In particular, for a text-based generative coding task, use of a cloud-based LLM (the same, or a separate LLM to that which could be used to aggregate the respective NL prompts) may be most appropriate. Use of a particular cloud-based GM may be specified by the user, may be implicit (e.g., a cloud-based GM specifically corresponding to the generative coding application), or may be selected automatically (e.g., by an agent of the user). Generative tasks of this nature can be computationally expensive and time consuming for an LLM. The techniques described herein can be used to process the various respective NL prompts in a computationally efficient manner, by aggregating multiple NL prompts into a joint NL prompt which can be more efficient to process than individual prompts.

Figure 5B:
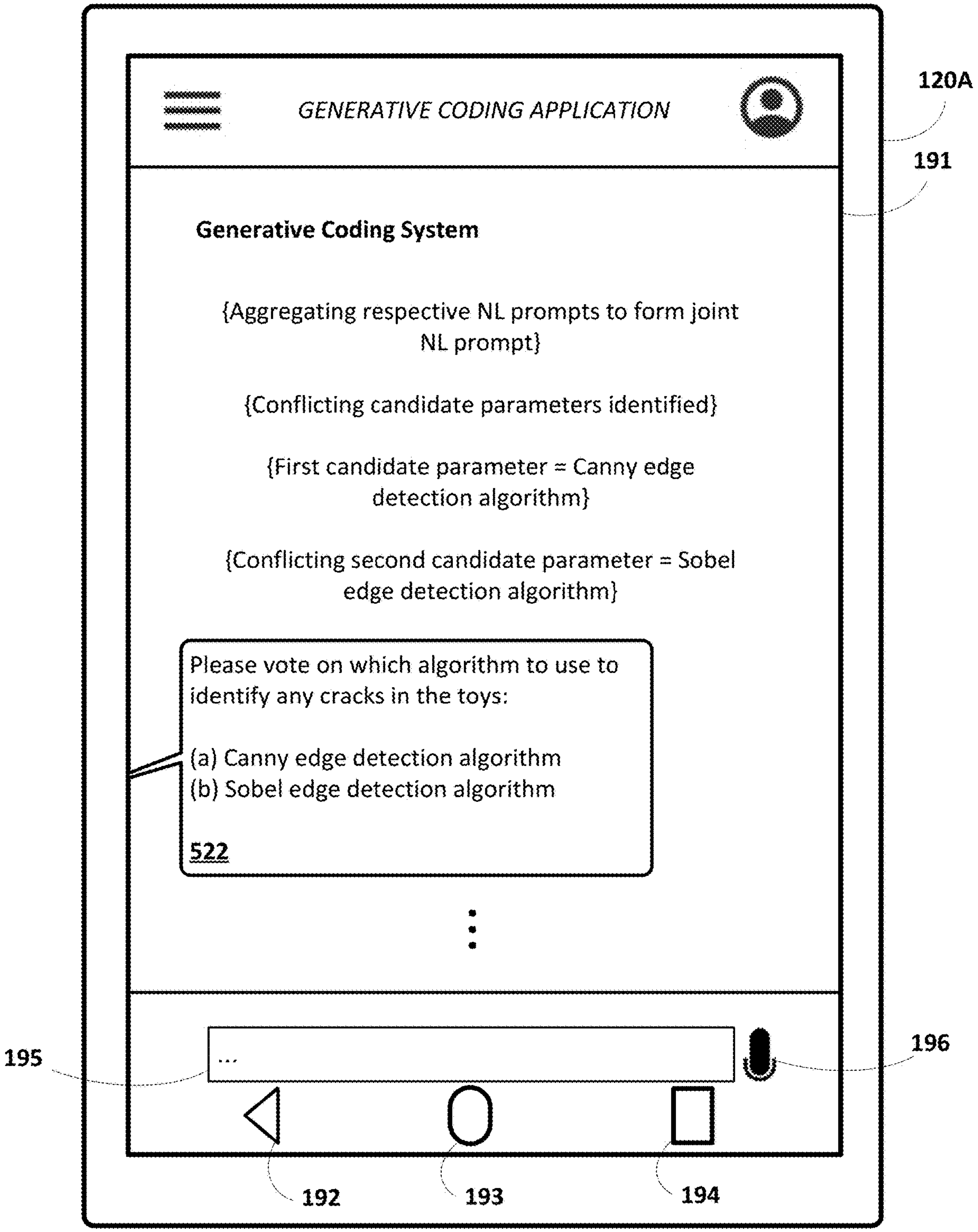

Referring specifically to FIG. 5B, and through the techniques described herein, the generative coding system may aggregate the three respective NL prompts to form a joint NL prompt. In this specific example, assume that a local client LLM (e.g., client GM 130A), which is hosted locally on client device 120A is used to aggregate the respective NL prompts. This local client LLM may may have billions of parameters, but may have fewer parameters than other GMs, such as cloud-based GMs described herein (including the cloud-based LLM which may be used to generate the responsive content in this specific example). Using a local client LLM instead of the cloud-based LLM for aggregation may be faster, and reduce network resource usage, as well as reducing computational expenditure at the cloud-based LLM. For example, a local client GM may have fewer than 1 billion, fewer than 2 billion, fewer than 4 billion, fewer than 8 billion, fewer than 10 billion, or fewer than 27 billion parameters. Cloud-based GMs described herein may have billions of parameters and may have more parameters than other GMs, such as local client GMs described herein. For example, a cloud-based GM may have more than 70 billion, more than 100 billion, more than 200 billion, more than 400 billion, or more than 1 trillion parameters.

The local client LLM may be prompted to identify any conflicting parameters, from the candidate parameters included in the respective NL prompts. Specifically, the local client LLM may identify a first candidate parameter of "Canny edge detection algorithm" and a conflicting second candidate parameter of "Sobel edge detection algorithm". It will be appreciated that these candidate parameters can be deemed to conflict in that they provide contradictory definitions of how the Python code should be written in order to identify cracks in the plastic toys. In this specific example, the generative coding system may be configured to use a user voting mechanism as a disambiguation process for resolving conflicts. As such, the generative coding application may provide each of the users/agents with a notification or message 522 of "Please vote on which algorithm to use to identify any cracks in the toys: (a) Canny edge detection algorithm; (b) Sobel edge detection algorithm".

Figure 5C:
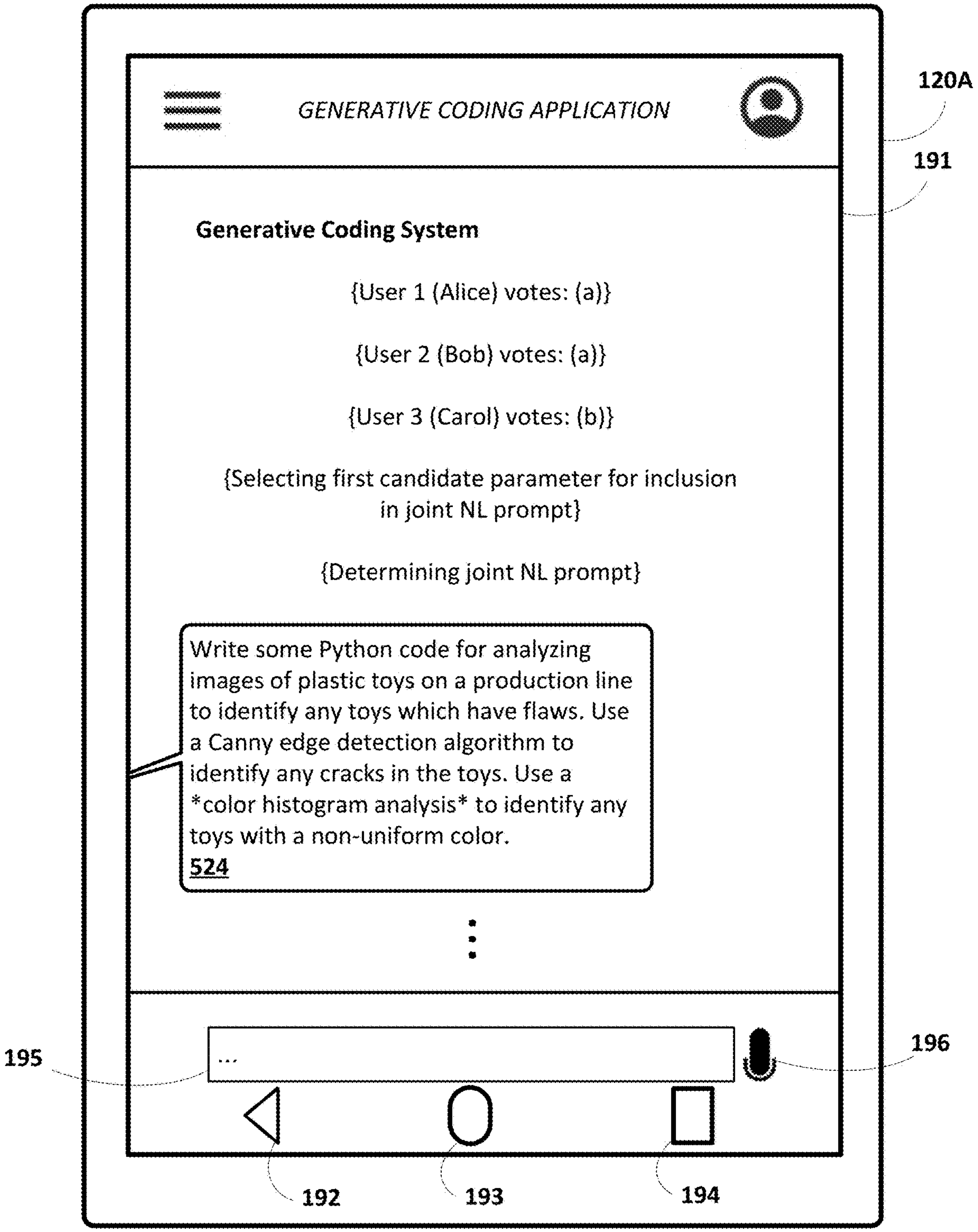

Referring specifically to FIG. 5C, the users/agents can provide their votes, responsive to notification 522, identifying their selection of which algorithm should be used to identify cracks in the toys in the Python code. In this specific example, Alice and Bob vote for option (a) and Carol votes for (b), and so by majority verdict, option (a) (i.e., the Canny edge detection algorithm) is selected for inclusion in the joint NL prompt. Based on the locking input referring to the candidate parameter "color histogram analysis", this candidate parameter is also selected for inclusion in the joint NL prompt. The local client LLM may be prompted to process each of the respective NL prompts, along with the decision to include the "color histogram analysis" candidate parameter and the decision to include the "Canny edge detection algorithm" candidate parameter in lieu of the "Sobel edge detection algorithm" candidate parameter to form the joint NL prompt. In some scenarios, the amount of input needed to the local client LLM can be reduced by removing the "Sobel edge detection algorithm" candidate parameter from the processing entirely. For instance, in this case, it will be appreciated that the NL prompt from the third user does not need to be processed by the local client LLM because the users/agents have voted against using any relevant candidate parameters from the third user's NL prompt. The generative coding application may provide a notification or message 524 showing the joint NL prompt, i.e., "Write some Python code for analyzing images of plastic toys on a production line to identify any toys which have flaws. Use a Canny edge detection algorithm to identify any cracks in the toys. Use a *color histogram analysis* to identify any toys with a non-uniform color.".

Figure 5D:
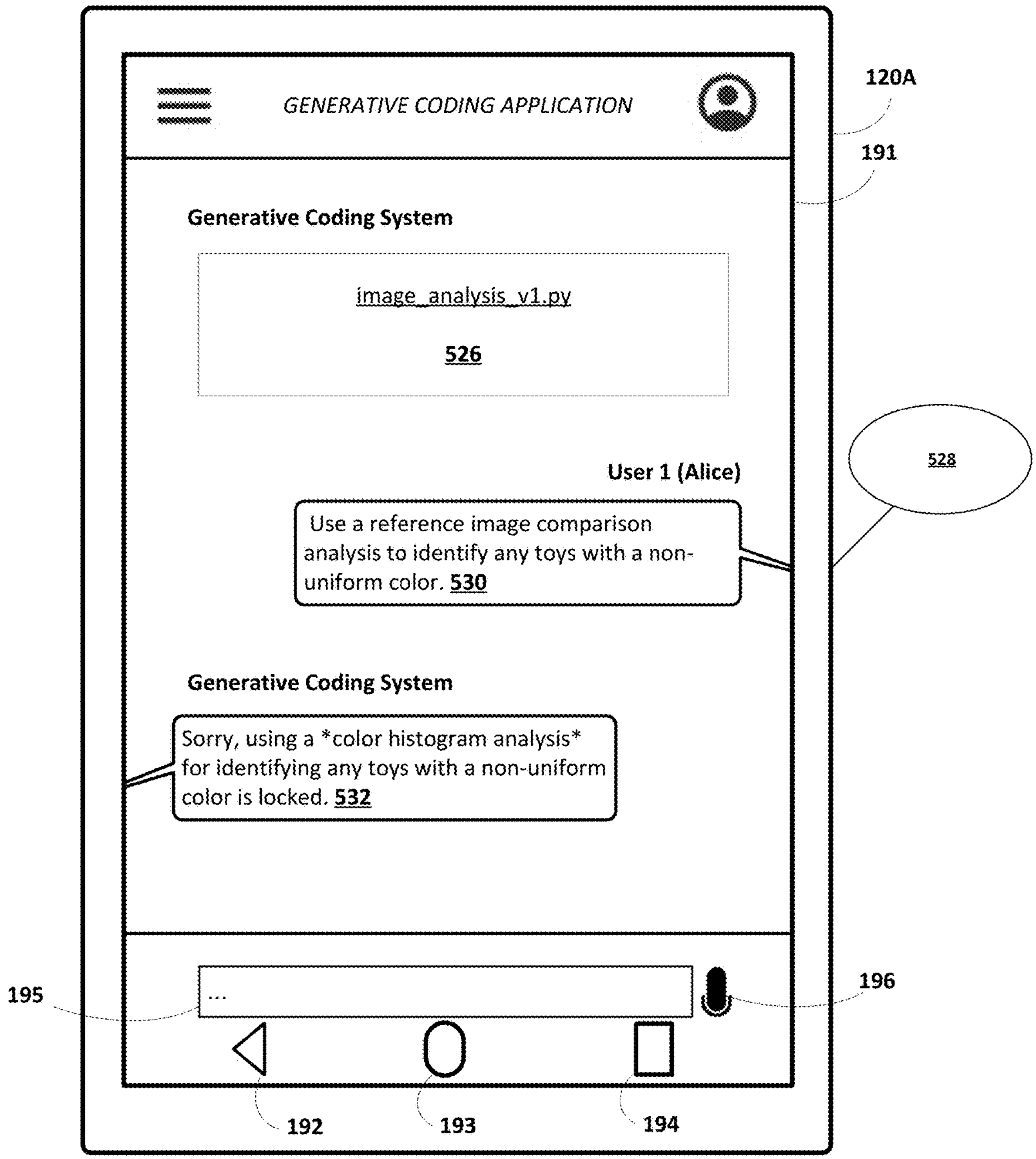

Referring specifically to FIG. 5D, the generative coding system may cause the cloud-based LLM to process the joint NL prompt to generate responsive content. This responsive content may take the form of a portion of Python code (i.e., a portion of text), represented as image_analysis_v1.py 526. Assume Alice provides a spoken voice NL input 528 of "Use a reference image comparison analysis to identify any toys with a non-uniform color." which corresponds to modification request 530. However, the generative coding system may recognize that the candidate parameter "reference image comparison" in this modification request conflicts with the locked parameter "*color histogram analysis*" in the joint NL prompt in in that they provide contradictory definitions of how the Python code should be written in order to identify non-uniform color in the plastic toys. Hence, the generative coding application may provide a notification or message 532 stating that "Sorry, using a *color histogram analysis* for identifying any toys with a non-uniform color is locked." to explain to Alice why the joint NL prompt cannot be modified or updated.

Figure 6:
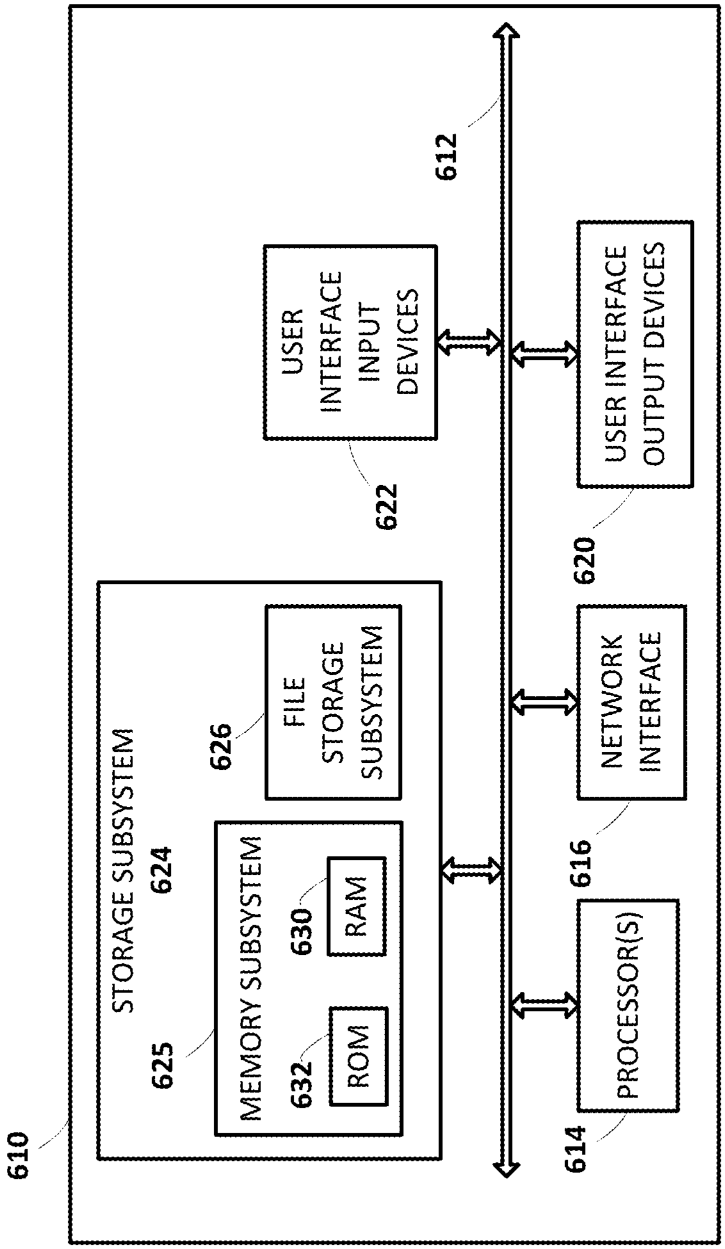
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, a client device (e.g., one or more of the client device(s) 120), generative content system component(s) or other cloud-based software application component(s) (e.g., component(s) of generative content system 140 and/or external system(s) 180), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein (e.g., as explained with respect to FIGS. 2, 3, and 4), as well as to implement various components depicted in FIGS. 1, 2, and 5A-5D.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users (or make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In particular, the techniques described herein can be specifically designed to ensure that the privacy of personally identifiable or otherwise private information associated with a particular agent and/or user is maintained. As one example, agents can be instructed to ensure that natural language (NL) prompts containing personally identifiable or otherwise private information (which e.g., can be identified/flagged using a local GM accessible to the agent) are not transmitted for aggregation as part of a joint NL prompt. As an additional or alternative example, aggregation of the respective NL prompts to form the joint NL prompt can include specifically prompting the entity that performs the aggregation (e.g., a cloud-based LLM) to generate a joint NL prompt which does not include any personally identifiable or otherwise private information. As an additional or alternative example, the respective NL prompts described herein may be formed using a limited vocabulary of instructions, parameters, variables, etc. This can ensure that the form which the various NL prompts take is not open ended, and is limited to a specific vocabulary which does not include personally identifiable or otherwise private information. Any or all of these techniques can be used to ensure that personally identifiable or otherwise private information does not form part of the joint NL prompt (because this joint NL prompt may be e.g., rendered at a client device accessible to users and/or agents) and cannot be used as a basis for generating responsive content (which also may be e.g., rendered at a client device accessible to users and/or agents).

In some implementations, a method implemented by one or more processors is provided, and includes: obtaining, from each agent of a plurality of agents, a respective natural language (NL) prompt, where each of the respective NL prompts can include one or more candidate parameters; aggregating the respective NL prompts to form a joint NL prompt; and causing the joint NL prompt to be processed using a generative model (GM) to generate responsive content. Aggregating the respective NL prompts to form the joint NL prompt can include: identifying a first candidate parameter and a conflicting second candidate parameter, where at least one of the respective NL prompts can include the first candidate parameter and at least one of the respective NL prompts can include the conflicting second candidate parameter; selecting, based on a disambiguation process, the first candidate parameter for inclusion in the joint NL prompt in lieu of the conflicting second candidate parameter; and determining, based on the respective NL prompts and the selection of the first candidate parameter for inclusion in the joint NL prompt in lieu of the conflicting second candidate parameter, the joint NL prompt.

These and other implementations of technology disclosed herein can optionally include one or more of the following features.

In some implementations, aggregating the respective NL prompts to form the joint NL prompt can be performed using a large language model (LLM).

In some versions of those implementations, the GM can be the LLM or another LLM, and the responsive content can include one or more portions of text data. In some versions of those implementations, the GM can be a visual generation model, and the responsive content can include one or more images, and/or one or more portions of video data, and/or one or more three-dimensional models, and/or one or more portions of augmented reality and/or virtual reality content. In some versions of those implementations, the GM can be an audio generation model, and the responsive content can include one or more portions of audio data.

In some implementations, identifying the first candidate parameter and the conflicting second candidate parameter can include: processing, using the LLM, first LLM input to generate corresponding first LLM output, the first LLM input including each of the respective NL prompts; and determining, based on the corresponding first LLM output, the first candidate parameter and the conflicting second candidate parameter.

In some versions of those implementations, the first LLM output can be indicative of an alignment score for the first candidate parameter and the conflicting second candidate parameter, and determining the first candidate parameter and the conflicting second candidate parameter can further include: responsive to the alignment score satisfying an alignment threshold, identifying the first candidate parameter and the second candidate parameter as conflicting candidate parameters.

In some implementations, the disambiguation process can include: processing, using the LLM, second LLM input to generate corresponding second LLM output, the second LLM input including at least the first candidate parameter and the conflicting second candidate parameter; determining, based on the corresponding second LLM output, feedback indicative of selection of the first candidate parameter; and determining, based on the feedback, that the first candidate parameter should be selected for inclusion in the joint NL prompt in lieu of the conflicting second candidate parameter.

In some implementations, the disambiguation process can include: prompting each agent of the plurality of agents to provide a respective vote, wherein each respective vote can be indicative of selection of the first candidate parameter or indicative of selection of the conflicting second candidate parameter; receiving, from one or more agents of the plurality of agents, one or more respective votes; and responsive to the one or more respective votes including more votes indicative of selection of the first candidate parameter than votes indicative of selection of the conflicting second candidate parameter, determining that the first candidate parameter should be selected for inclusion in the joint NL prompt in lieu of the conflicting second candidate parameter.

In some versions of those implementations, each of the one or more respective votes can be generated based on a respective user input corresponding to a respective user, each respective user corresponding to a respective agent of the one or more agents.

In some implementations, the disambiguation process can include: identifying, from the plurality of agents, a lead agent; receiving, from the lead agent, feedback indicative of selection of the first candidate parameter; and determining, based on the feedback, that the first candidate parameter should be selected for inclusion in the joint NL prompt in lieu of the conflicting second candidate parameter.

In some implementations, aggregating the respective NL prompts to form the joint NL prompt can further include: identifying a third candidate parameter and a locking input referring to the third candidate parameter, wherein at least one of the respective NL prompts includes the third candidate parameter; selecting, based on the locking input referring to the third candidate parameter, the third candidate parameter for inclusion in the joint NL prompt; and determining, further based on the selection of the third candidate parameter for inclusion in the joint NL prompt, the joint NL prompt.

In some implementations, the method can further include: processing, using the GM, first GM input to generate corresponding first GM output, the first GM input including the joint NL prompt; and determining, based on the corresponding first GM output, the responsive content.

In some implementations, the method can further include: causing the responsive content as well as each of the respective NL prompts and/or the joint NL prompt to be cached in a memory.

In some implementations, the method can further include: causing the responsive content and/or the joint NL prompt to be rendered at a client device.

In some implementations, the method can further include: obtaining, from each of a subset of the plurality of agents, a respective updated NL prompt, wherein each of the respective updated NL prompts includes one or more updated candidate parameters; determining, based on at least the respective updated NL prompts, an updated joint NL prompt; and causing the updated joint NL prompt to be processed using the GM to generate updated responsive content.

In some versions of those implementations, the method can further include: processing, using the GM, second GM input to generate corresponding second GM output, the second GM input including a portion of the updated joint NL prompt that diverges from the joint NL prompt processed previously using the GM; and determining, based on the corresponding second GM output, the updated responsive content.

In some versions of those implementations, the method can further include: causing the updated responsive content as well as each of the respective updated NL prompts and/or the updated joint NL prompt to be cached in a memory.

In some implementations, the method can further include: causing the updated responsive content and/or the updated joint NL prompt to be rendered at a client device; receiving a request to transition back to the joint NL prompt, the request based on user input received by one or more agents of the plurality of agents; and responsively causing the responsive content to be rendered at the client device in lieu of the updated responsive content and/or responsively causing the joint NL prompt to be rendered at the client device in lieu of the updated joint NL prompt.

In some implementations, a method implemented by one or more processors is provided, and includes: obtaining, from each agent of a plurality of agents, a respective natural language (NL) prompt, wherein each of the respective NL prompts includes one or more candidate parameters; and aggregating the respective NL prompts to form a joint NL prompt. Aggregating the respective NL prompts to form the joint NL prompt can include: identifying a first candidate parameter and a locking input referring to the first candidate parameter, wherein at least one of the respective NL prompts can include the first candidate parameter; selecting, based on the locking input referring to the first candidate parameter, the first candidate parameter for inclusion in the joint NL prompt; and determining, based on the respective NL prompts and the selection of the first candidate parameter for inclusion in the joint NL prompt, the joint NL prompt. The method can further include: receiving, from at least one agent of the plurality of agents, a request to modify at least the first candidate parameter of the joint NL prompt; refraining, based on the locking input referring to the first candidate parameter, from modifying the first candidate parameter of the joint NL prompt; and causing the joint NL prompt to be processed using a generative model (GM) to generate responsive content.

These and other implementations of technology disclosed herein can optionally include one or more of the following features.

In some implementations, the method can further include: receiving, from at least one agent of the plurality of agents, the locking input referring to the first candidate parameter.

In some implementations, aggregating the respective NL prompts to form the joint NL prompt can be performed using a large language model (LLM).

In some versions of those implementations, the GM can be the LLM or another LLM, and the responsive content can include one or more portions of text data. In some versions of those implementations, the GM can be a visual generation model, and the responsive content can include one or more images, and/or one or more portions of video data, and/or one or more three-dimensional models, and/or one or more portions of augmented reality and/or virtual reality content. In some versions of those implementations, the GM can be an audio generation model, and the responsive content can include one or more portions of audio data.

In some implementations, the method can further include: processing, using the GM, first GM input to generate corresponding first GM output, the first GM input including the joint NL prompt; and determining, based on the corresponding first GM output, the responsive content.

In some implementations, the method can further include: causing the responsive content as well as each of the respective NL prompts and/or the joint NL prompt to be cached in a memory.

In some implementations, the method can further include: causing the responsive content and/or the joint NL prompt to be rendered at a client device.

In some implementations, the method can further include: obtaining, from each of a subset of the plurality of agents, a respective updated NL prompt, wherein each of the respective updated NL prompts includes one or more updated candidate parameters; determining, based on at least the respective updated NL prompts, an updated joint NL prompt; and causing the updated joint NL prompt to be processed using the GM to generate updated responsive content.

In some versions of those implementations, the method can further include: processing, using the GM, second GM input to generate corresponding second GM output, the second GM input including a portion of the updated joint NL prompt that diverges from the joint NL prompt processed previously using the GM; and determining, based on the corresponding second GM output, the updated responsive content.

In some versions of those implementations, the method can further include: causing the updated responsive content as well as each of the respective updated NL prompts and/or the updated joint NL prompt to be cached in a memory.

In some implementations, the method can further include: causing the updated responsive content and/or the updated joint NL prompt to be rendered at a client device; receiving a request to transition back to the joint NL prompt, the request based on user input received by one or more agents of the plurality of agents; and responsively causing the responsive content to be rendered at the client device in lieu of the updated responsive content and/or responsively causing the joint NL prompt to be rendered at the client device in lieu of the updated joint NL prompt.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer-readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
- obtaining, from each agent of a plurality of agents, a respective natural language (NL) prompt, wherein each of the respective NL prompts comprises one or more candidate parameters;
- aggregating the respective NL prompts to form a joint NL prompt, wherein aggregating the respective NL prompts to form the joint NL prompt comprises:
  - identifying a first candidate parameter and a conflicting second candidate parameter, wherein at least one of the respective NL prompts comprises the first candidate parameter and at least one of the respective NL prompts comprises the conflicting second candidate parameter;
  - selecting, based on a disambiguation process, the first candidate parameter for inclusion in the joint NL prompt in lieu of the conflicting second candidate parameter; and
  - determining, based on the respective NL prompts and the selection of the first candidate parameter for inclusion in the joint NL prompt in lieu of the conflicting second candidate parameter, the joint NL prompt; and
- causing the joint NL prompt to be processed using a generative model (GM) to generate responsive content.

2. The method of claim 1, wherein aggregating the respective NL prompts to form the joint NL prompt is performed using a large language model (LLM).

3. The method of claim 2, wherein:
- the GM is the LLM or another LLM, and wherein the responsive content comprises one or more portions of text data; or
- the GM is a visual generation model, and wherein the responsive content comprises one or more images, and/or one or more portions of video data, and/or one or more three-dimensional models, and/or one or more portions of augmented reality and/or virtual reality content; or
- the GM is an audio generation model, and wherein the responsive content comprises one or more portions of audio data.

4. The method of claim 2, wherein identifying the first candidate parameter and the conflicting second candidate parameter comprises:

processing, using the LLM, first LLM input to generate corresponding first LLM output, the first LLM input comprising each of the respective NL prompts; and determining, based on the corresponding first LLM output, the first candidate parameter and the conflicting second candidate parameter.

5. The method of claim 4, wherein the first LLM output is indicative of an alignment score for the first candidate parameter and the conflicting second candidate parameter, and wherein determining the first candidate parameter and the conflicting second candidate parameter further comprises:

responsive to the alignment score satisfying an alignment threshold, identifying the first candidate parameter and the second candidate parameter as conflicting candidate parameters.

6. The method of claim 2, wherein the disambiguation process comprises:

processing, using the LLM, second LLM input to generate corresponding second LLM output, the second LLM input comprising at least the first candidate parameter and the conflicting second candidate parameter;

determining, based on the corresponding second LLM output, feedback indicative of selection of the first candidate parameter; and determining, based on the feedback, that the first candidate parameter should be selected for inclusion in the joint NL prompt in lieu of the conflicting second candidate parameter.

7. The method of claim 1, wherein the disambiguation process comprises:

prompting each agent of the plurality of agents to provide a respective vote, wherein each respective vote is indicative of selection of the first candidate parameter or indicative of selection of the conflicting second candidate parameter;

receiving, from one or more agents of the plurality of agents, one or more respective votes; and responsive to the one or more respective votes comprising more votes indicative of selection of the first candidate parameter than votes indicative of selection of the conflicting second candidate parameter, determining that the first candidate parameter should be selected for inclusion in the joint NL prompt in lieu of the conflicting second candidate parameter, optionally wherein each of the one or more respective votes is generated based on a respective user input corresponding to a respective user, each respective user corresponding to a respective agent of the one or more agents.

8. The method of claim 1, wherein the disambiguation process comprises:

identifying, from the plurality of agents, a lead agent;

receiving, from the lead agent, feedback indicative of selection of the first candidate parameter; and determining, based on the feedback, that the first candidate parameter should be selected for inclusion in the joint NL prompt in lieu of the conflicting second candidate parameter.

9. The method of claim 1, wherein aggregating the respective NL prompts to form the joint NL prompt further comprises:

identifying a third candidate parameter and a locking input referring to the third candidate parameter, wherein at least one of the respective NL prompts comprises the third candidate parameter;

selecting, based on the locking input referring to the third candidate parameter, the third candidate parameter for inclusion in the joint NL prompt; and determining, further based on the selection of the third candidate parameter for inclusion in the joint NL prompt, the joint NL prompt.

10. The method of claim 1, further comprising:

processing, using the GM, first GM input to generate corresponding first GM output, the first GM input comprising the joint NL prompt; and determining, based on the corresponding first GM output, the responsive content.

11. The method of claim 1, further comprising:

causing the responsive content as well as each of the respective NL prompts and/or the joint NL prompt to be cached in a memory.

12. The method of claim 1, further comprising:

causing the responsive content and/or the joint NL prompt to be rendered at a client device.

13. The method of claim 1, further comprising:

obtaining, from each of a subset of the plurality of agents, a respective updated NL prompt, wherein each of the respective updated NL prompts comprises one or more updated candidate parameters;

determining, based on at least the respective updated NL prompts, an updated joint NL prompt; and causing the updated joint NL prompt to be processed using the GM to generate updated responsive content.

14. The method of claim 13, further comprising:

processing, using the GM, second GM input to generate corresponding second GM output, the second GM input comprising a portion of the updated joint NL prompt that diverges from the joint NL prompt processed previously using the GM; and determining, based on the corresponding second GM output, the updated responsive content.

15. The method of claim 14, further comprising:

causing the updated responsive content as well as each of the respective updated NL prompts and/or the updated joint NL prompt to be cached in a memory.

16. The method of claim 13, further comprising:

causing the updated responsive content and/or the updated joint NL prompt to be rendered at a client device;

receiving a request to transition back to the joint NL prompt, the request based on user input received by one or more agents of the plurality of agents; and responsively causing the responsive content to be rendered at the client device in lieu of the updated responsive content and/or responsively causing the joint NL prompt to be rendered at the client device in lieu of the updated joint NL prompt.

17. A method implemented by one or more processors, the method comprising:

obtaining, from each agent of a plurality of agents, a respective natural language (NL) prompt, wherein each of the respective NL prompts comprises one or more candidate parameters;

aggregating the respective NL prompts to form a joint NL prompt, wherein aggregating the respective NL prompts to form the joint NL prompt comprises:

identifying a first candidate parameter and a locking input referring to the first candidate parameter, wherein at least one of the respective NL prompts comprises the first candidate parameter;

selecting, based on the locking input referring to the first candidate parameter, the first candidate parameter for inclusion in the joint NL prompt; and determining, based on the respective NL prompts and the selection of the first candidate parameter for inclusion in the joint NL prompt, the joint NL prompt;

receiving, from at least one agent of the plurality of agents, a request to modify at least the first candidate parameter of the joint NL prompt;

refraining, based on the locking input referring to the first candidate parameter, from modifying the first candidate parameter of the joint NL prompt; and causing the joint NL prompt to be processed using a generative model (GM) to generate responsive content.

18. The method of claim 17, further comprising:

receiving, from at least one agent of the plurality of agents, the locking input referring to the first candidate parameter.

19. The method of claim 17, wherein aggregating the respective NL prompts to form the joint NL prompt is performed using a large language model (LLM); and the GM is the LLM or another LLM, wherein the responsive content comprises one or more portions of text data; or the GM is a visual generation model, wherein the responsive content comprises one or more images, and/or one or more portions of video data, and/or one or more three-dimensional models, and/or one or more portions of augmented reality and/or virtual reality content; or the GM is an audio generation model, wherein the responsive content comprises one or more portions of audio data.

20. A system comprising:

at least one processor; and memory storing instructions that, when executed by the at least one processor, cause the at least one processor to be operable to perform a method comprising:

obtaining, from each agent of a plurality of agents, a respective natural language (NL) prompt, wherein each of the respective NL prompts comprises one or more candidate parameters;

aggregating the respective NL prompts to form a joint NL prompt, wherein aggregating the respective NL prompts to form the joint NL prompt comprises:

identifying a first candidate parameter and a conflicting second candidate parameter, wherein at least one of the respective NL prompts comprises the first candidate parameter and at least one of the respective NL prompts comprises the conflicting second candidate parameter;

selecting, based on a disambiguation process, the first candidate parameter for inclusion in the joint NL prompt in lieu of the conflicting second candidate parameter; and determining, based on the respective NL prompts and the selection of the first candidate parameter for inclusion in the joint NL prompt in lieu of the conflicting second candidate parameter, the joint NL prompt; and causing the joint NL prompt to be processed using a generative model (GM) to generate responsive content.

* * * * *